United States Patent
Davis

(10) Patent No.: US 8,947,538 B2
(45) Date of Patent: Feb. 3, 2015

(54) SYSTEM FOR VIDEO QUALITY PREDICTION AND RELATED ASPECTS

(75) Inventor: Andrew G Davis, Woodbridge (GB)

(73) Assignee: British Telecommunications Public Limited Company, London (GB)

( * ) Notice: Subject to any disclaimer, the term of this patent is extended or adjusted under 35 U.S.C. 154(b) by 268 days.

(21) Appl. No.: 13/638,827

(22) PCT Filed: Mar. 31, 2011

(86) PCT No.: PCT/GB2011/000504
§ 371 (c)(1),
(2), (4) Date: Oct. 1, 2012

(87) PCT Pub. No.: WO2011/121311
PCT Pub. Date: Oct. 6, 2011

(65) Prior Publication Data
US 2013/0016224 A1    Jan. 17, 2013

(30) Foreign Application Priority Data
Mar. 31, 2010 (EP) .................. 10250691

(51) Int. Cl.
*H04N 17/00* (2006.01)
*H04N 19/86* (2014.01)
*H04N 19/00* (2014.01)
*H04N 7/50* (2006.01)

(52) U.S. Cl.
CPC ....... *H04N 7/26888* (2013.01); *H04N 7/26335* (2013.01); *H04N 17/004* (2013.01)
USPC .......................................... 348/192; 375/240

(58) Field of Classification Search
USPC ..................................... 348/192; 375/240.16
See application file for complete search history.

(56) References Cited

U.S. PATENT DOCUMENTS 5,745,178 A * 4/1998 Hartung et al. .......... 375/240.04
7,869,517 B2 * 1/2011 Ghanbari ................. 375/240.16
(Continued)

FOREIGN PATENT DOCUMENTS

WO    WO 2010/004238    1/2010

OTHER PUBLICATIONS

International Search Report for PCT/GB2011/000504, mailed May 30, 2011.
(Continued)

*Primary Examiner* — Sath V Perungavoor
*Assistant Examiner* — Howard D Brown, Jr.
(74) *Attorney, Agent, or Firm* — Nixon & Vanderhye P.C.

(57) ABSTRACT

A method of generating a measure of quality for a decoded form of a video signal comprises: generating a quality measure dependent on a quantizer step size parameter according to a predetermined relationship; generating a plurality of masking measures, and applying a weighting to each masking measure, wherein each masking measurement is dependent on the spatial complexity of one or more types of regions present in pictures formed by decoding the video signal. One type of region comprises an active region of a picture in a video sequence for which a prediction residual measure meets a first condition. Another type of region comprises a region of the picture in the video sequence for which the prediction residual measure meets another condition. The quality measure and the plurality of weighted quality masking measures are combined to generate a combined quality measure for the decoded form of the video signal.

25 Claims, 14 Drawing Sheets

(56) References Cited

U.S. PATENT DOCUMENTS

| | | | |
|---|---|---|---|
| 8,824,547 B2* | 9/2014 | Nilsson et al. | 375/240.02 |
| 2005/0281333 A1* | 12/2005 | Ghanbari | 375/240.16 |
| 2008/0317111 A1* | 12/2008 | Davis | 375/227 |
| 2010/0061446 A1* | 3/2010 | Hands et al. | 375/240.02 |
| 2011/0102601 A1* | 5/2011 | Davis | 348/180 |

OTHER PUBLICATIONS

Liu et al., "Modeling the masking effect of the human visual system with visual attention model", Information, Communcations, and Signal Processing, (Dec. 8, 2009), pp. 1-5.

Zhang et al., "Improved estimation for just-noticeable visual distortion", Signal Processing, vol. 85, No. 4, (Apr. 1, 2005), pp. 795-808.

* cited by examiner

PRIOR ART

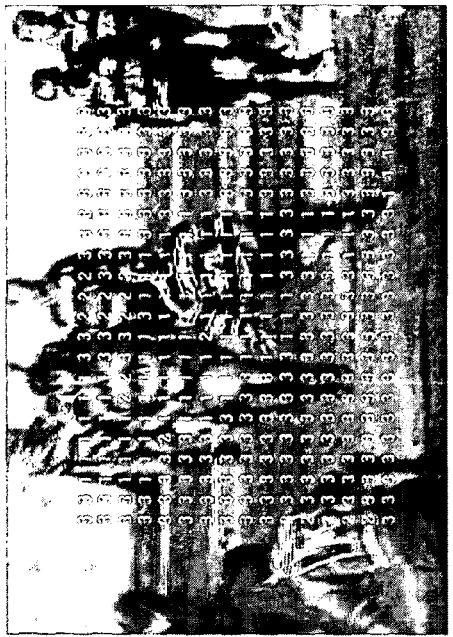
Figure 6a — Frame 1 of 3
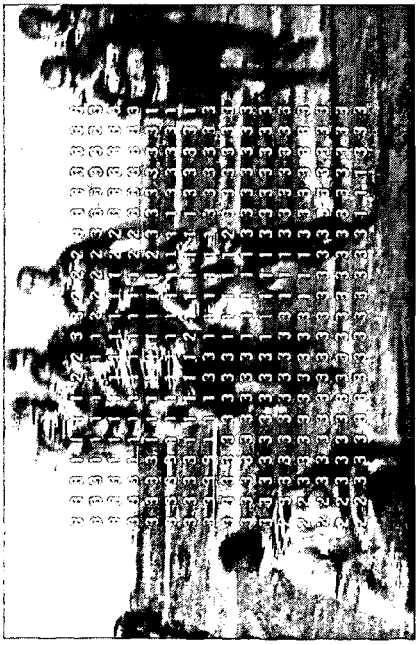
Figure 6b — Frame 2 of 3
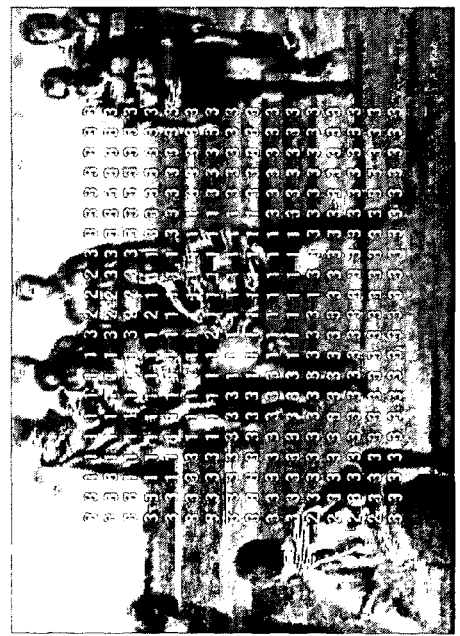
Figure 6c — Frame 3 of 3
Macroblocks are marked as:
1 = high activity
2 = not high activity but high detail
3 = low detail and low activity background

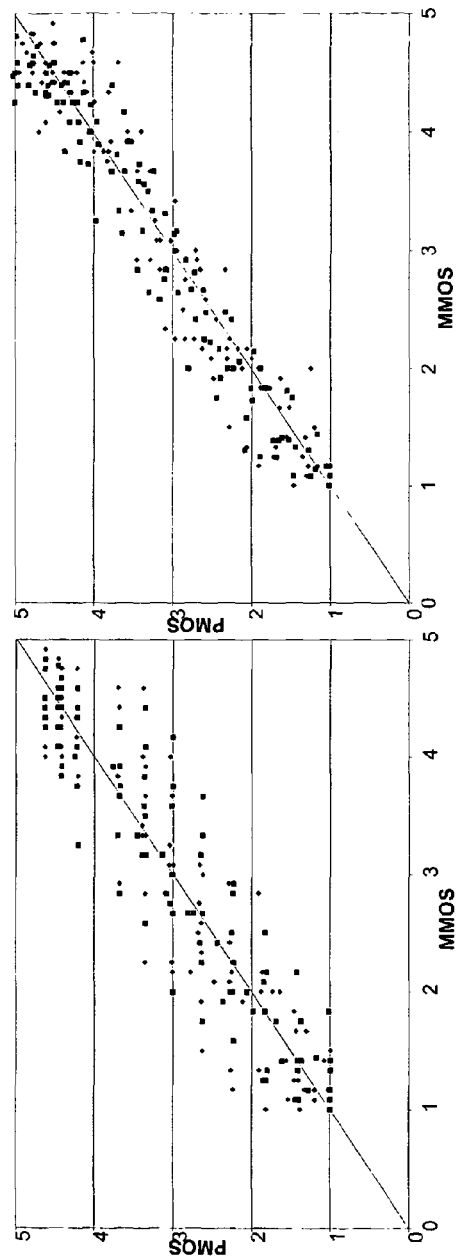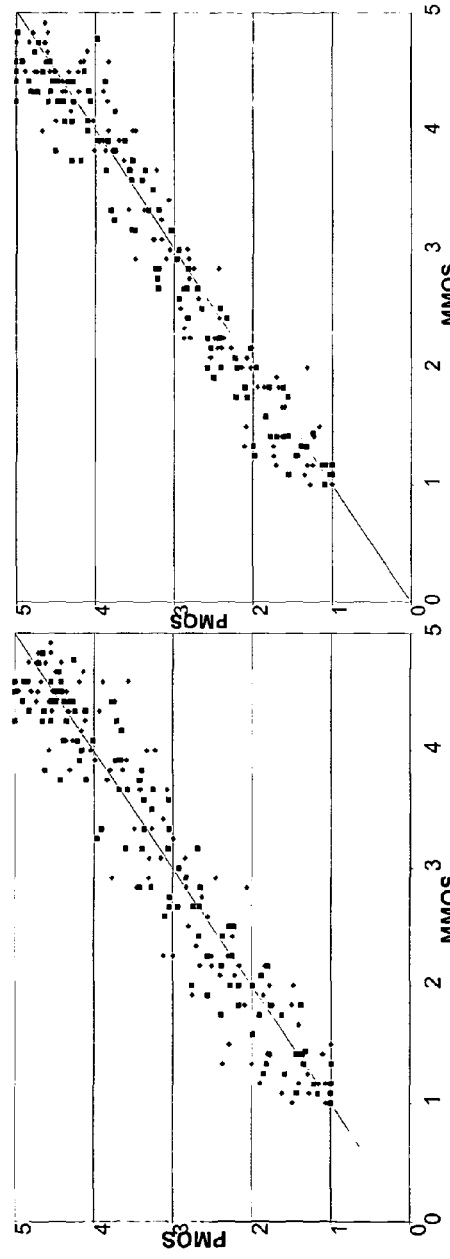
Figure 12a
Figure 12b
Figure 12c
Figure 12d

US 8,947,538 B2

SYSTEM FOR VIDEO QUALITY PREDICTION AND RELATED ASPECTS

This application is the U.S. national phase of International Application No. PCT/GB2011/000504, filed 31 Mar. 2011, which designated the U.S. and claims priority to EP Application No. 10250691.2, filed 31 Mar. 2010, the entire contents of each of which are hereby incorporated by reference.

This invention is concerned with a video quality measure, in particular in situations where a video signal has been encoded using a compression algorithm.

When a video signal is to be transmitted from one location to another, it is known to encode or compress the signal using an encoding algorithm, such that the encoded signal can be transmitted using a lower bandwidth than would be needed without encoding. Upon reception, the encoded signal is decoded to retrieve the original signal. In many encoding techniques, a two dimensional cosines transform is performed, resulting in a series of transform coefficients, whose magnitude is quantized. So that the bandwidth can be allocated efficiently, the granularity of the quantisation, that is, the step size, is allowed to vary.

The process of encoding and decoding the video sequence can introduce distortion or otherwise reduce the quality of the signal. One way of measuring the level of distortion involves noting the opinion of viewers as to the level of perceptible distortion in a distorted video sequence, and averaging the results so as to obtain a Mean Opinion Score (MOS). However, this can be a time consuming process. As a result, it can be desirable to predict the loss of quality that a viewer will perceive in a video sequence. Although the degradation in the video quality as a result of encoding/decoding and the transmission process can be obtained by reference to the original sequence, such an approach is often inconvenient.

In predictive coding, the difference between the actual signal and the predicted one, known as the "prediction residual" may be transmitted. More usually, a quantised version of it is transmitted.

According to international patent application WO2007/066066, there is provided a method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associable therewith; and, a decoded form in which the encoded video signal has been at least in part reconverted to the original form, the method comprising the steps of: a) generating a first quality measure which is a function of said quantiser step size parameter; b) generating a second quality measure which is a function of the spatial complexity of at least part of the frames represented by the video signal in the decoded form; and, c) combining the first and second measures.

According to international patent application, WO 2010004238, there is provided a method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associated therewith and utilising differential coding such that the encoded signal contains representations of the prediction residual of the signal; and a decoded form in which the encoded video signal has been at least in part reconverted to the original form, the method comprising: a) generating a first quality measure which is dependent on said quantiser step size parameter according to a predetermined relationship; b) generating a masking measure, the masking measure being dependant on the spatial complexity of at least part of the frames represented by the video signal in the decoded form according to a predetermined relationship; and c) generating a combined measure, the combined measure being dependent upon both the first measure and the masking measure according to a predetermined relationship; wherein the method also includes: generating a second measure which is dependent on the prediction residual of the signal according to a predetermined relationship; identifying one or more regions of the picture for which the second measure exceeds a threshold; and wherein the masking measure is dependent on the spatial complexity of the identified region(s) according to a predetermined relationship.

The above techniques predict a picture quality measure using measures based on quantizer step-size and average contrast.

Full-reference video quality measurement tools, utilising both source and degraded video sequences in analysis are also known to be able to provide highly accurate predictions of video quality for broadcast video.

The design of no-reference techniques with no access to the pre-impaired "reference" sequence such as those of the embodiments of the invention is more challenging. Known no-reference analysis techniques require access to the encoded bit-stream, either within a decoder or elsewhere in the network. Such "bit-stream" analysis has the advantage of having ready access to coding parameters, such as quantizer step-size, motion vectors and block statistics, which are unavailable to a frame buffer analysis. Bit-stream analysis can range from computationally light analysis of decoded parameters, with no inverse transforms or motion predicted macroblock reconstruction, through to full decoding of the video sequence. When placed in a full video decoder, the bit-stream analysis may be used in conjunction with frame buffer techniques.

Earlier work such as that by A. G. Davis, D. Bayart, D. S. Hands, entitled "Hybrid No-reference Video Quality Prediction," BMSB 2009, 13-15 May 2009 and that published in WO 2007/066066 presented a no-reference video quality prediction technique operating within a H.264/AVC decoder that outperformed the full-reference PSNR measure in predicting subjective video quality. This technique combines a measure of average quantizer step-size AvQP from the encoded parameters with a pixel-difference noise masking measure CS taken from the decoded image sequence. The resulting decoder-based "hybrid" no-reference model is shown to achieve a high correlation between measured and estimated subjective scores when tested over a variety of H.264 encoded sequences.

In WO2010/004238, a spatially sensitive measure of noise masking CWS is introduced as an improvement to the picture-averaged measure CS. The CWS measure is calculated over a region K4 that includes the highest activity and highest contrast areas of a picture. High activity is assigned to areas of each picture with the highest proportion of non-zero quantized transform coefficients and such areas are assumed to be difficult to predict with a high degree of detail. The high activity and high contrast areas of the picture that make up the region K4 attract visual attention and are important in the perception of quality. These areas are therefore used to calculate the noise masking measure CWS.

The invention seeks to improve the estimation of the quality of encoded broadcast video sequences within a video decoder which such known techniques provide.

SUMMARY STATEMENTS OF THE INVENTION

The aspects and embodiments of the invention are as set out below and in the accompanying claims and may be combined with each other in any suitable manner apparent to one of ordinary skill in the art. References herein to one or an embodiment do not necessarily refer to the same embodiment.

A first aspect of the invention seeks to provide a method of generating a measure of quality for a decoded form of a video signal, the video signal having: an original form; an encoded form in which the video signal has been encoded using a compression algorithm utilising a variable quantiser step size such that the encoded signal has a quantiser step size parameter associated therewith and utilising differential coding such that the encoded signal contains representations of the prediction residual of the signal; and said decoded form in which the encoded video signal has been at least in part reconverted to the original form, the method comprising: generating a quality measure dependent on said quantiser step size parameter according to a predetermined relationship; generating a plurality of quality masking measures, each masking measure being dependant on the spatial complexity of one or more types of regions present in pictures formed by decoding the video signal, wherein one type of region comprises an active region of a picture in said video sequence for which a prediction residual measure meets a first condition, and at least one other type of region comprises a region of the picture in said video sequence for which said prediction residual measure meets another condition; and combining the quality measure and the plurality of quality masking measures to generate a combined quality measure for the decoded form of the video signal.

The first condition may comprise said prediction residual measure exceeding a prediction-residual-threshold value for an active region of a picture. The quantiser step size parameter here is that used to encode the picture.

At least one said other type of region may comprise a high-contrast region of the picture. The other condition may comprise the prediction residual measure not exceeding said prediction-residual-threshold for a high contrast region region; and a spatial complexity measure exceeding a spatial-complexity-threshold value for a high-contrast region, The method may further comprise determining a luminance measure for each type of region.

Each of said plurality of quality masking measures for each type of region may be combined with a weighting dependent on the luminance measure for the respective type of region or the luminance difference between different regions.

At least one said other type of region comprises a background region of the picture, and wherein said other condition comprises:
the prediction residual measure not exceeding said prediction-residual-threshold value for a background region; and
the spatial complexity measure not exceeding said spatial-complexity-threshold value for a background region.

The prediction-residual threshold value for a high contrast region and/or a background region may be:
a value greater than the value for an active region;
a value equal to the value for an active region;
a value less than the value for an active region.

This enables regions to be distinct (so that a macroblock belongs to only one region) or overlap (a macroblock may belong to more than one region).

The spatial complexity threshold value for a background region may be: a value greater than the value for a high-contrast region; a value equal to the value for a high-contrast region; a value less than the value for a high-contrast region.

When combining said quality measure and each of said plurality of quality masking measures for each type of region, a weighting function may be applied to each quality masking measure dependent on the type of region.

The weighting function for said at least one type of region may be dependent on the luminance measure or on the luminance difference between different types of regions whose masking measures are being weightedly combined.

Another aspect of the invention seeks to provide a method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associated therewith and utilising differential coding such that the encoded signal contains representations of the prediction residual of the signal; and a decoded form in which the encoded video signal has been at least in part reconverted to the original form, the method comprising: generating a first quality measure which is dependent on said quantiser step size parameter according to a predetermined relationship; generating a masking measure, the masking measure being dependant on the spatial complexity of at least part of the frames represented by the video signal in the decoded form according to a first predetermined relationship; and generating a combined measure, the combined measure being dependent upon both the first quality measure and the masking measure according to a predetermined relationship, wherein, the method is characterised by said masking measure being dependant on the spatial complexity of one or more active region(s) according to a predetermined relationship and on the spatial complexity of one or more background regions according to a predetermined relationship, wherein said one or more active regions are identified by: generating a first measure which is dependent on the prediction residual of the signal according to a first predetermined relationship, and identifying one or more regions for which the first measure meets a condition as one or more active regions; and, wherein said one or more background regions are identified by: generating a second measure which is dependent on the prediction residual of the signal according to a second predetermined relationship; and identifying one or more background regions of the picture for which the second measure meets a condition as one or more background regions. Another aspect of the invention seeks to provide apparatus arranged to generate a measure of quality for a plurality of frames of a decoded form of a video signal, the video signal having: an original form; an encoded form in which the original form of the video signal has been encoded using a compression algorithm utilising a variable quantiser step size such that the encoded signal has a quantiser step size parameter associated therewith and utilising differential coding such that the encoded signal contains representations of the prediction residual of the signal; and said decoded form in which the encoded video signal has been at least in part reconverted to the original form, the apparatus comprising: means to generate a quality measure which is dependent on said quantiser step size parameter according to a predetermined relationship; means to determine one or more active regions in a picture of said video sequence for which the prediction residual exceeds a threshold condition; means to determine other types of regions within any remaining part of said picture; means to generate a masking measures dependent on the spatial complexity of each of said active regions and each determined type of region; and means to generate a combined quality measure by combining said quality measure and masking measure according to a predetermined relationship.

The means to determine a masking measure may determine a spatial complexity masking measure for each said region which is dependent on a pixel-difference contrast measure for the pixels forming the area of the respective region.

The means to determine a masking measure may comprise means for determining and combining spatial complexity masking measures for each determined region using a weighting function for each type of determined region.

The apparatus may further comprise means to determine a luminance measure for each said picture.

The weighting function for each respective region of a said picture may be dependent on the luminance within said respective region.

A weighting function applied to a masking measure may be a non-linear function. A weighting functions may be dependent on an area of a respective region and/or on a luminance property of said region in a non-linear manner. The weighting may apply a threshold such that a region of finite area may have zero weighting.

Another aspect of the invention seeks to provide a method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associated therewith and utilising differential coding such that the encoded signal contains representations of the prediction residual of the signal; and a decoded form in which the encoded video signal has been at least in part reconverted to the original form, the method comprising:
a) generating a first quality measure which is dependent on said quantiser step size parameter according to a predetermined relationship;
b) generating a masking measure, the masking measure being dependant on the spatial complexity of at least part of the frames represented by the video signal in the decoded form according to a first predetermined relationship; and
c) generating a combined measure, the combined measure being dependent upon both the first quality measure and the masking measure according to a predetermined relationship wherein, the method also includes:
    generating a first measure which is dependent on the prediction residual of the signal according to a first predetermined relationship; and
    identifying one or more active regions of the picture for which the first measure meets a condition,
and further comprises:
    generating a second measure which is dependent on the prediction residual of the signal according to a second predetermined relationship; and
    identifying one or more background regions of the picture for which the second measure meets a condition,
    wherein the masking measure is dependent on the spatial complexity of the identified active region(s) according to a predetermined relationship and wherein the masking measure is also dependent on the spatial complexity of the identified background region(s) according to a predetermined relationship.

A said measure may include a temporally determined component, and wherein said regions of the picture for which the first measure meets a condition are determined from temporal changes to said picture regions.

At least one of said one or more background regions of the picture identified by said second measure meeting said condition may comprise a higher area in a said picture than at least one of said one or more regions of the picture for which the first measure meets said respective condition.

The representations of the prediction residual may be the coefficients of a two-dimensional transform of the pixel-domain prediction residual, and one or both of the first and second measure may be calculated from said coefficients. The transform may be a discrete cosine transform.

A said measure may be a count of the number of nonzero transform coefficients.

A said measure may be dependent on the amplitudes of the transform coefficients.

A said measure may be a function of the sum of the energies of the decoded coefficients.

The condition which the first measure is to meet may comprise the first measure exceeding a threshold value, and wherein the masking measure includes a function of the spatial complexity of: (a) the identified region(s) of the picture for which the first measure exceeds a threshold and (b) a region or regions of the picture in which the first measure does not exceed the threshold but in which the spatial complexity exceeds a second threshold.

The second threshold may be dynamically varied, being a function of the spatial complexity calculated for the identified region(s).

The second threshold may be equal to the average value of the spatial complexity calculated for the identified region(s).

The first quality measure may be derived only from those parts of the picture from which the masking measure is derived.

The spatial complexity may be measured by determining a local contrast measure at a plurality of positions in a frame.

Each frame may include plurality of pixels, and wherein for at least some of the pixels of a given frame, the comparison function is performed on neighbouring regions in the vicinity of a pixel, so as to obtain a comparison value in respect of that pixel.

The quality and/or first and/or second measure is averaged over a plurality of frames.

Another aspect of the invention seeks to provide apparatus comprising a decoder for a video sequence and further comprising means arranged to perform one or more steps according to a method aspect.

Thus one embodiment of the invention seeks to provide a method of generating a PMOS for a video sequence in which a non-linearly weighted masking function is applied to high prediction residual activity region(s) in each picture of the video sequence and in which other weighted functions are applied to one or more other regions of each picture which also are shown to provide a masking effect. For example, in one embodiment, a masking measure which takes into account the contribution of background regions in each picture (which have low prediction residual activity and also low level of spatial complexity) is determined. In another embodiment, the contributions from regions of high contrast (which have high levels of spatial complexity) are weighted by a measure of the luminous intensity. Some embodiments of the invention weight the background regions of the invention and high contrast regions by taking into account a measure of the luminous intensity in each of the picture regions in the a video sequence when calculating a PMOS score for the video sequence.

Embodiments of the invention will now be described with reference to the accompanying drawings which are by way of example only and in which:

FIGS. 6a, 6b, 6c show a sequence of frames, in which on each frame of the sequence macroblocks indicating areas of high activity, not high activity but high detail, and low activity and low activity background are shown.

FIG. 7c shows how a sequence averaged pixel-difference contrast measure CS varies against AvQP for the nine video sequences shown in FIG. 7a;

FIG. 7d shows how a sequence averaged pixel-difference weighted contrast measure CSW based on regions of high-DCT activity and regions of low-DCT activity but high contrast varies against AvQP for the nine video sequences shown in FIG. 7a;

FIGS. 12a,b,c,d show schematically the correlation of results for MMOS and PMOS for both training and testing sequences.

The best mode of the invention will now be described with reference to the accompanying drawings. In the following description of the preferred embodiments of the invention, those of ordinary skill in the art will be aware of modifications and functional equivalents to those features of the invention which are described herein below and that certain features of the invention may be omitted from the description for the sake of brevity and clarity where their inclusion and function as part of the invention is apparent and known to those of ordinary skill in the art.

The detailed description which follows below attempts to show that the use of the regional measure CWS is further improved by considering the area, location and contrast of the active and high contrast regions K4 along with the area and contrast of the "background" region K5 for the video sequences considered. The "active" and "background" measures are combined using a non-linear weighting function CWSN that increasingly weights towards the "background" measure for sequences that have a low proportion of active areas.

Consideration is first given to the use of average quantizer step-size AvQP to estimate subjective quality. Secondly, the noise masking measures CS and CWS are reviewed. Then, the non-linear weighting function CWSN for the "active" and "background" regions is described. Finally, quality prediction results are presented for models designed around the parameters AvQP, CS, CWS and CWSN for H.264 encoded broadcast format sequences.

Figure 1:
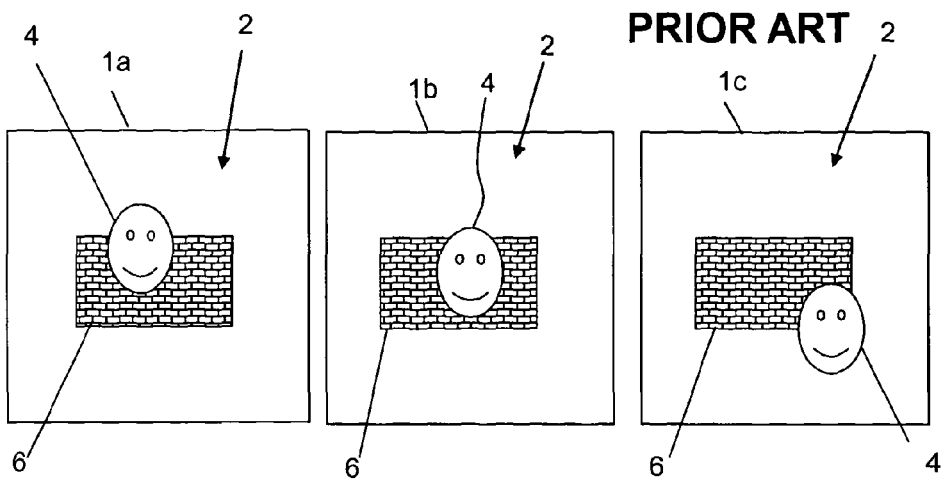
FIG. 1 shows schematically a series of three frames indicating regions of temporal activity, detailed and non-detailed background.

FIG. 1 of the accompanying drawings shows a simplistic set of three consecutive frames 1a, 1b, 1c in a video sequence. Each picture shows a background region of low activity and low background detail 2 (shown as white/blank in FIGS. 1a,b,c), a region of high activity 4 (which from frame to frame in FIGS. 1a,b,c is shown by the movement of the smiley face), and an area of not much high activity but of high detail 6 (shown as the "brick" hatched area in FIGS. 1a, 1b, and 1c).

Figure 2:
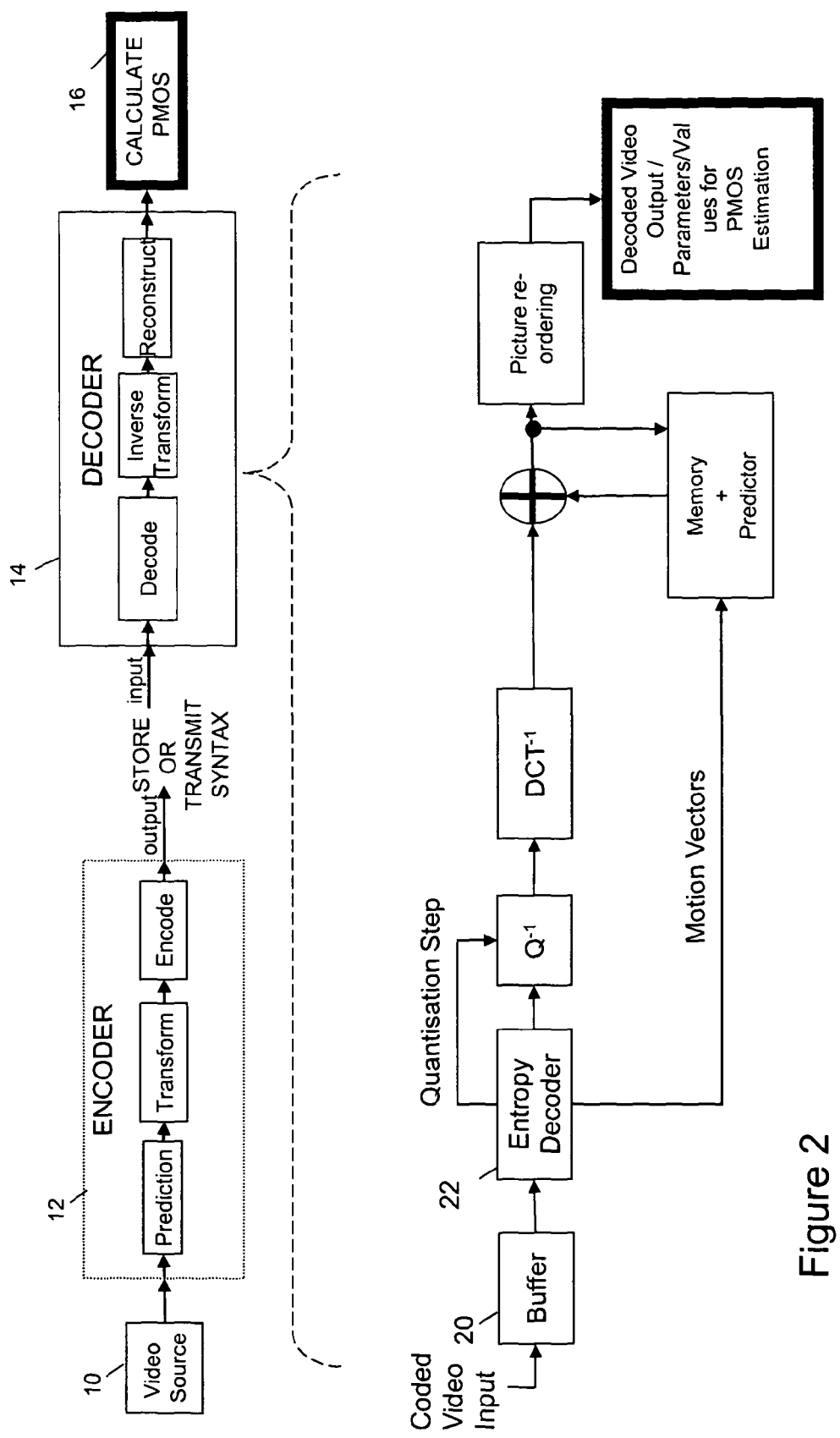
FIG. 2 shows a basic encoding/decoding system for which the quality of a video sequence can be estimated.

FIG. 2 of the accompanying drawings shows schematically a typical video encoding/decoding system comprising a video compressor or encoder 12 arranged to convert a video sequence from data source 10 into a compressed form which occupies less bits by removing redundant data. The encoder 12 uses a suitable video compression technique to compact a digital video sequence into a smaller number of bits to enable more efficient storage and transport. The electronic signal output from the encoder can be either stored on a fixed storage medium or, assuming it is suitable encoded for transmission, transmitted, over a communications network either as a file or bit-stream. A decoder 14 decompresses the compressed video sequence into a format suitable for playback on a suitable device (not shown).

As shown schematically in FIG. 2, the encoder 12 comprises functional blocks which include prediction, transforming and encoding received data and the decoder comprises functional blocks which decode received data, perform an inverse transform, and finally reconstruct the video frame sequence. The reconstructed video frame sequence will, when viewed, be considered by most viewers to have a particular picture/sound etc quality.

Changes between video frames result from both object motion, camera motion, uncovered objects, and lighting changes. Motion results in pixel movements between frames and a set of temporal model parameters (for example, motion vectors to represent how the motion between frames was compensated for by the temporal model) which is sent to an entropy encoder. Various techniques are known to estimate motion and compensate for this including block based techniques which are based on "blocks" of pixels within a frame. A small block-size involves more complexity (to determine what pixels will form a "block") but usually results in a residual which has less energy (i.e., as the motion prediction for the block is more accurate), but a frame then requires a larger set of motion vectors. The H.264 video coding standard for example, uses an adaptive motion compensation block size, which basically adapts the block size to the picture characteristics so that typically large blocks are used for flat, homogenous regions of a frame whereas small blocks are provided in areas of high detail and complex motion.

As shown in FIG. 2, the video decoder comprises a buffer 20, an entropy decoder 22 which reconstructs a video frame from a compressed bit stream by first decoding the coded spatial and temporal model parameters (the coded residual coefficients and motion vector parameters). The spatial model is then decoded to enable a version of the residual frame to be reconstructed. The decoder then uses the temporal model parameters together with one or more previously decoded frames to create a prediction of the current frame, and the actual current frame is reconstructed by adding the residual frame to the prediction.

In broadcast systems, a video sequence is usually encoded for playback by a plurality of decoders which may have different decoding characteristics or which are arranged to decode differently depending on the display characteristics they are providing output to. The video sequence is encoded in a format which supports its display at various levels of perceived video quality and each device must determine how best to decode the received video sequence according to its display characteristics.

As all high video compression techniques are lossy, the decompressed picture quality will differ from the quality prior to compression and the perceived quality of the decompressed picture may differ as the human eye responds differently to light at different wavelengths of the visible electromagnetic spectrum. For example, for many people the photopic response of the eye (its ability to distinguish between different frequencies of light, i.e., our colour vision) generally varies differently to the scotopic response (the eye's ability to distinguish the intensity of light, i.e., how bright or dim a particular frequency (colour)) is as a function of wavelength. In general, determining the most appropriate technique for de-coding a video sequence depends to some extent on the type of image sequence the video contains. For example, the human eye response is sensitive to the contrast between different parts of a image and to the level of motion in the background and foreground parts of the image.

One way of enabling a decoder to determine the quality of a received video sequence is to provide reference frames in the video sequence. Reference frames are provided to enable video quality to be measured and full-reference video quality measurement tools, utilising both source and degraded video sequences in analysis, have been shown to be capable of highly accurate predictions of video quality for broadcast video (see for example the Final report from the Video Quality Experts Group on the Validation of Objective Models of Video Quality Assessment, Phase 2, available to down load from www.vqeg.org, and ITU-T, J.144, "Objective perceptual video quality measurement techniques for digital cable television in the presence of a full reference".

No-reference video quality prediction techniques which operate within a H.264/AVC decoder and combine a measure of average quantizer step-size ("AvQP") from the encoded parameters with a pixel-difference noise masking measure "CS" taken from the decoded image sequence, which measures pixel contrast, are known in the art. CS, the pixel-difference noise masking measure provides a picture quality prediction which is picture-averaged and the prediction can be improved by using a spatially sensitive measure of noise masking "CWS" which is calculated over a region that includes both the highest activity and highest contrast areas of a picture. The CWS measure is based on determining which areas of a picture have the highest proportion of non-zero quantized transform coefficients ("high activity"). Although high activity areas can be difficult to predict with a high degree of detail by combining these areas with the areas of high contrast in a picture, the regions of the picture which are visually attractive and important in the perception of the video quality can be determined.

The embodiments of the invention described herein below relate to a no-reference, decoder-based video quality assessment tool. An algorithm for the tool can operate inside a video decoder, using the quantiser step-size parameter (normally a variable included in the incoming encoded video stream) for each decoded macroblock and the pixel intensity values from each decoded picture to make an estimate of the subjective quality of the decoded video.

The term "picture" as used herein refers to a single still image decoded for playback in a give time interval in the video sequence. In the embodiments below each still image is generally considered to be formed from a decoded "frame" to be played in the given time interval, unless explicitly stated otherwise. Persons of ordinary skill in the art, however, will be aware that a frame may be provided in a non-interlaced form, or formed from two (or possibly more) interlaced fields from which a picture is reconstructed. Thus, in the broadest sense, each still image may comprise a frame formed from interleaved and/or overlaid macroblocks from different fields played back at different times. Persons of ordinary skill in the art will be aware that whilst the embodiments described herein primarily address non-interlaced video, they can be readily adapted to address the picture quality of interlaced video, by noting the different configuration of the macroblocks which form each picture region in the relevant interlaced format as appropriate.

A sliding-window average pixel intensity difference (pixel contrast measure) calculation is performed on the decoded pixels for each frame forming a picture and the resulting average pixel contrast measure for each picture image (CWS) is used as a measure of the noise masking properties of the video. The quality estimate is then made as a function of the CWS parameter and an average of the step-size parameter. The function is predetermined by multiple regression analysis on a training data base of characteristic decoded sequences and previously obtained subjective scores for the sequences. The use of the combination of, on the one hand the step-size and, on the other hand, a sliding-window average pixel intensity difference measure to estimate the complexity will be shown to provide a good estimate of subjective quality. In principle the measurement process used is applicable generally to video signals that have been encoded using compression techniques using transform coding and having a variable quantiser step size. The versions to be described however are designed for use with signals encoded in accordance with the H.262 and H.264 standards. (Although it also applies to the other DCT based standard codecs, such as H.261, H.263, MPEG-2 (frame based) etc.)

A measurement method according to the invention is of the non-intrusive or "no-reference" type—that is, it does not need to have access to a copy of the original signal. The method is designed for use within an appropriate decoder, as it requires access to both the parameters from the encoded bit stream and the decoded video pictures, although the measurement method may alternatively be implemented using an adjunct device if one or more suitable interfaces with a decoder are provided to allow access to the parameters and the pictures decoded from the bit stream. Distortion masking is an important factor affecting the perception of distortion within coded video sequences. Such masking occurs because of the inability of the human perceptual mechanism to distinguish between signal and noise components within the same spectral, temporal or spatial locality. As efficient allocation of bits is important for encoding, the pixel-difference noise masking measure CS is of great use.

Figure 3:
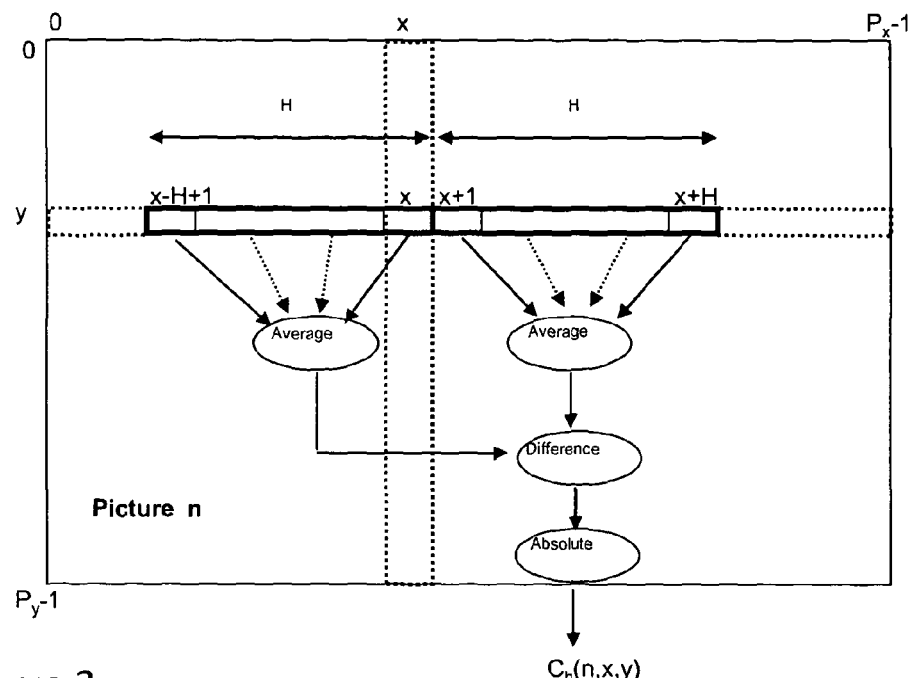
FIG. 3 shows how a horizontal contrast measure is calculated for a pixel in a picture.
Figure 4:
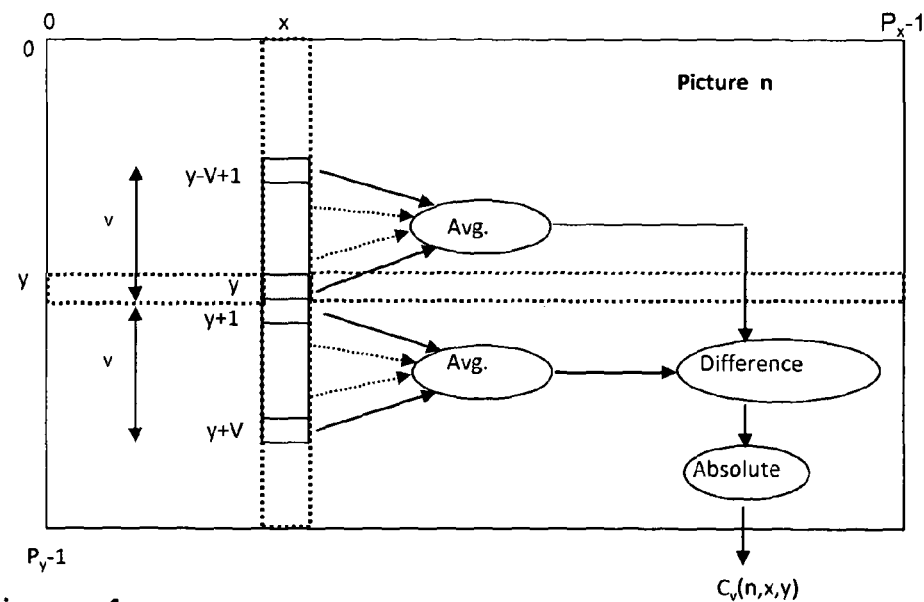
FIG. 4 shows how a vertical contrast measure is calculated for a pixel in a picture.

FIGS. 3 and 4 illustrate a known technique for determining a contrast measure CS is calculated for pixels p(x,y) at position (x,y) within a picture of size X pixels in the horizontal direction and Y pixels in the vertical direction respectively, for example, such as is described in WO2007/066066. As shown in FIG. 3, a contrast measure is calculated in respect of pixel p(x,y), shown by the shaded region. Adjacent areas of equivalent size are selected (one of which includes the shaded pixel). Each area is formed from a set of (preferably consecutive) pixels from the row in which the shaded pixel is located.

The pixel intensity in each area is averaged, and the absolute difference in the averages is then calculated according to equation (2) below, the contrast measure being the value of this difference.

The vertical contrast measure is calculated in a similar fashion, as shown in FIG. 4. Here, an upper set of pixels and a lower set of pixels are select. Each of the selected pixels lies on the same column, the shaded pixel next to the border between the upper and lower sets. The intensity of the pixels in the upper and lower sets is averaged, and the difference in the average intensity of each set is then evaluated, the absolute value of this difference being the vertical contrast measure as set out in equation (3) below, that is, a measure of the contrast in the vertical direction. In the present example, the shaded pixel is included in the lower set. However, the position of the pixel with which the contrast measure is associated is arbitrary, provided that it is in the vicinity of the boundary shared by the pixels sets being compared.

To obtain the horizontal contrast measure, row portions of length H1 and H2 are compared, whereas to obtain the vertical contrast measure, column portions of length V1 and V2 are compared (the length H1, H2 and V1, V2 may but need not be the same, as shown in FIGS. 3 and 4 H1=H2=H, and V1=V2=V). The contrast measure is associated with a pixel whose position is local to the common boundary of, on the one hand, the row portions and on the other hand the column portions. The so-calculated horizontal contrast measure and vertical contrast measure are then compared, and the greater of the two values (termed the horizontal-vertical measure as set out in equation (4)) is associated with the shaded pixel, and stored in memory.

This procedure is repeated for each pixel in the picture (within vertical distance V1, V2 and horizontal distances H1, H2 from the vertical and horizontal edges of the picture respectively), thereby providing a sliding window analysis on the pixels, with a window size of H1, H2, V1 or V2. The horizontal-vertical measure for each pixel in the picture (frame) is then averaged and this overall measure associated with each picture is then averaged over a plurality of pictures to obtain a sequence-averaged measure. The number of pictures over which the overall measure is averaged will depend on the nature of the video sequence, and the time between scene changes, and may be as long as a few seconds. Only part of a picture need be analysed in this way, as will be described in more detail below.

By measuring the contrast at different locations in the picture and taking the average, a simple measure of the complexity of the picture is obtained. Because complexity in a picture can mask distortion, and thereby cause an observer to believe that a picture is of a better quality for a given distortion, the degree of complexity in a picture can be used in part to predict the subjective degree of quality a viewer will associate with a video signal.

The width or height of the respective areas about the shaded pixel is related to the level of detail at which an observer will notice complexity. Thus, if an image is to be viewed from afar, these will be chosen so as to be larger than in situations where it is envisaged that the viewer will be closer to the picture. Since in general, the distance from a picture at which the viewer will be comfortable depends on the size of the picture, the size will also depend on the pixel size and the pixel dimensions (larger displays typically have larger pixels rather than more pixels, although for a given pixel density, the display size could also be a factor). Typically, it is expected that H1, H2 and V1, V2 will each be between 0.5% and 2% of the respective picture dimensions. For example, the horizontal values could be 4*100/720=0.56%, where there are 720 pixels horizontally and each set for average contains 4 pixels, and in the vertical direction, 4*100/576=0.69% where there are 576 pixels in the vertical direction.

Accordingly, as shown in FIGS. 3 and 4, the horizontal pixel difference contrast measures $C_h$ is are calculated according to $$C_h(n, x, y) = \text{abs}\left(\left((1/H1)\sum_{j=0}^{H1-1} d(n, x-j, y)\right) - \left((1/H2)\sum_{j=0}^{H2-1} d(n, x+1+j, y)\right)\right) \quad (1)$$

$$x = H1-1 \ldots X - H2 - 1$$

$$y = 0 \ldots Y - 1$$

where d(n,x,y) is the pixel intensity value (0.255) within the n'th frame of N from decoded sequence d of dimension of X horizontal (x=0 . . . X−1) and Y vertical (y=0 . . . Y−1) pixels, and the vertical pixel contrast measure is calculated from $$C_v(n, x, y) = \text{abs}\left(\left((1/V1)\sum_{j=0}^{V1-1} d(n, x, y-j)\right) - \left((1/V2)\sum_{j=0}^{V2-1} d(n, x, y+1+j)\right)\right) \quad (2)$$

$$x = 0 \ldots X - 1$$

$$y = V1-1 \ldots Y - V2 - 1$$

where H1 and H2 are the window lengths for horizontal pixel analysis and V1 and V2 are the window lengths for vertical pixel analysis.

$C_h$ and $C_v$ may then be combined to give a horizontal-vertical measure $C_{hv}$, $$C_{hv}(n,x,y) = \max(C_h(n,x,y), C_v(n,x,y))$$

$$x = H1-1 \ldots X-H2-1$$

$$y = V1-1 \ldots Y-V2=1 \quad (3)$$

Figure 5:
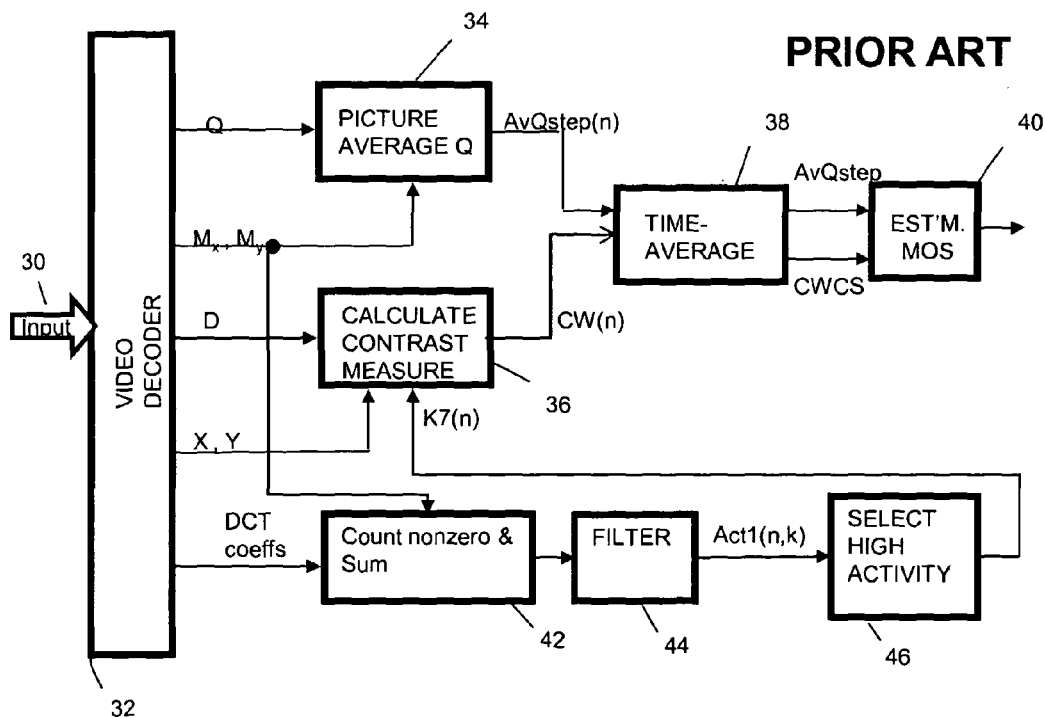
FIG. 5 shows in process block form an apparatus known in the art for estimating the quality of a video sequence.

FIG. 5 shows functionally how WO2007/066066 used these contrast measures to provide a perceived mean-opinion-score quality measure (PMOS). FIG. 5 corresponds to FIG. 1 of WO2007/066066, the contents of which are hereby incorporated by reference, and provides a functional block diagram of decoder components which provide a PMOS derived from contrast measures calculated for areas of high activity.

In the apparatus shown in FIG. 5, the incoming signal is received at an input 30 and passes to a video decoder 32 which decodes and outputs the following parameters for each picture:
Decoded picture (D).
Horizontal decoded picture size in pixels (X)
Vertical decoded picture size in pixels (Y)
Horizontal decoded picture in macroblocks ($M_x$)
Vertical decoded picture size in macroblocks ($M_y$)
Set of quantiser step-size parameters (Q)
DCT coefficients (R).

There are two processing paths shown in the apparatus of FIG. 5, which serve to calculate the picture-averaged quantiser step-size signal AvQstep(n) (process block 34) and the picture-averaged contrast measure CW(n) (process block 36). Process block 38 time averages signals AvQstep(n) and CW(n) to give signals AvQstep and CWS respectively.

Finally, these signals are combined in process block 40 to give an estimated PMOS of the subjective quality for the decoded video sequence D.

Process blocks 34 to 40 could be implemented by individual hardware elements but a more convenient implementation is to perform all those stages using a suitably programmed processor. Also shown in FIG. 5 are process blocks 42, 44, and 46 which collectively enable an area of high activity to be selected from the filtered inverse transform coefficients (DCT coeffs) output by the video decoder 32.

In contrast to FIG. 5, one or more embodiments of the invention determine the PMOS by taking into account a measure of the luminous intensity of a video sequence.

The results obtained using a technique which considers the luminous intensity indicate this provides improved automated PMOS scores, i.e., a PMOS which is generated in dependence on luminous intensity measures enables a better prediction of the quality of video which would be perceivable by a human viewer viewing the same video sequence to be made.

Whilst some video encoding standards such as MPEG4 encode a limited luminance range other video encoding methods are known in which a highly dynamic range video encoding techniques is used which can take into account the full range of luminance (although for practical purposes this is limited to a range which the human eye can perceive).

FIGS. 6a to 6c show how macroblocks within a series of still images which form a video sequence display different characteristics which are considered when determining image quality according to the invention. In FIGS. 6a to 6c a sequence of still images or pictures is shown in which within a cropped focus of attention region (comprising macroblocks forming region K6, described in more detail herein below), various picture regions are identified. These still images will form pictures displayed in the video sequence. A method of generating an estimate of a PMOS according to an embodiment of the invention calculates how each different type of picture region affects the overall PMOS of the video sequence, firstly by analysing per picture and then over the sequence of pictures forming the video. The method determines the way the macroblocks present in a picture have been coded and estimates the how the amount of information lost in the coding process will affect the quality of the decoded picture displayed. This quality measure is dependent on the quantisation step-size used to encode the original picture, and provides an estimate for the amount of noise which might be noticeably present in the picture when viewed. The method also estimates how the displayed content of each picture and how any change of content from picture to picture in the video sequence affects the noticeability of any drop in quality due to noise generated by the coding quantisation loss by identifying one or more different types of picture regions, each having a different set of display characteristics which are capable of impacting perceived picture quality. A measure of the masking each different type of region identified in a picture provides on the overall perceivable picture quality (and of the perceived video quality) is calculated. One embodiment of the method identifies types of regions from a level of background detail and spatial complexity in each picture as well as a level of activity in a video sequence so their relative effect can be analysed.

Examples of a video sequence showing macroblocks of high activity (marked as 1) macroblocks with no high-activity but high detail (marked as 2), and with low detail and low activity background (marked as 3) are shown in FIGS. 6a to 6c.

Macroblocks marked 1 (also denoted as macroblocks K1∧ K6) forming a high activity region in each picture comprise macroblocks which are in both region K1 (as they macroblocks which have a prediction residual measure dependent on the coding prediction residuals which is above or equal to a threshold value) and in region K6 (the cropped focus of attention region). In each picture, a macroblock which has been marked with a 2 (also denoted as a macroblock K3∧ K6) comprises a so-called high-contrast macroblock for which a spatial complexity masking measure dependent on the spatial complexity of the blocks or pixels forming each macroblock is above a threshold value and also lies in the cropped picture region K6. Macroblocks K3∧ K6 are described in more detail herein below. Each macroblock marked with a 3 comprises a macroblock in a background region K5 (described in more detail herein below), for which the prediction residual measure dependent on the coding prediction residuals of the macroblock meets or is below (as appropriate) the threshold value determining when a region is considered to have a high level of prediction residual activity.

The video database used to train and test the technique consisted of eighteen different 8-second sequences, all of 625-line broadcast format. Six of the sequences were from the VQEG Phase I database [9] and the remaining sourced from elsewhere. As the quality parameters were to be based on averages over the duration of each sequence, it was important to select content with consistent properties of motion and detail. Details of the sequences are shown in Table 1 below:

TABLE 1

Training and test sequences.

| Training Sequence | Characteristics | Test Sequence | Characteristics |
| --- | --- | --- | --- |
| Presenter | Local detail and motion. | Athletics | Fast pan and local motion |
| Dance | Fast zoom, high motion, low detail. | Football1 | Fast zoom and pan, local detail and motion |
| Football2 | Fast pan, local detail and motion. | News | Slow zoom, local detail and motion. |
| Ship | Slow pan, water, detail. | Weather | Low motion, high texture. |
| Soap | Slow pan, high contrast, motion. | Fries | Fast pan, film. |
| Barcelona | Saturated colour, slow zoom. | Rocks | Movement, contrast variations. |
| Canoe | Water movement, pan, detail. | Sport | Thin detail, movement. |
| Harp | Slow zoom, thin detail. | Calendar | High detail, slow pan. |
| View | Slow movement, detail. | Rugby | Movement, fast pan. |

TABLE 2

Subjective MMOS scores for training sequences on a scale where 1 is bad and 5 is excellent.

| Sequence | QP-P, QP-B | | | | | | | | | | | |
|---|---|---|---|---|---|---|---|---|---|---|---|---|
| | 14 | 16 | 24 | 26 | 30 | 32 | 34 | 36 | 38 | 40 | 42 | 44 |
| Presenter | 4.58 | 4.83 | 4.50 | 4.33 | 3.83 | 3.33 | 3.08 | 2.50 | 2.08 | 2.00 | 1.25 | 1.17 |
| Dance | 4.50 | 4.00 | 4.08 | 4.17 | 3.83 | 4.00 | 3.25 | 2.75 | 2.42 | 2.17 | 1.67 | 1.50 |
| Football2 | 4.25 | 4.08 | 4.00 | 3.75 | 2.92 | 2.25 | 2.17 | 1.50 | 1.17 | 1.00 | 1.00 | 1.08 |
| Ship | 4.58 | 4.50 | 4.67 | 4.33 | 3.67 | 3.42 | 2.83 | 2.17 | 2.08 | 1.92 | 2.00 | 1.17 |
| Soap | 4.42 | 4.42 | 4.50 | 3.83 | 2.92 | 2.83 | 2.25 | 1.92 | 1.33 | 1.33 | 1.08 | 1.08 |
| Barcelona | 4.50 | 4.50 | 4.75 | 4.33 | 3.92 | 3.92 | 3.08 | 3.00 | 2.25 | 1.83 | 1.42 | 1.17 |
| Canoe | 4.50 | 4.92 | 4.33 | 4.33 | 3.92 | 3.33 | 3.00 | 2.58 | 2.17 | 1.83 | 1.25 | 1.17 |
| Harp | 4.83 | 4.50 | 4.67 | 4.42 | 4.42 | 3.67 | 3.67 | 2.33 | 2.25 | 2.08 | 1.83 | 1.42 |
| View | 4.58 | 4.75 | 4.75 | 4.75 | 4.58 | 4.58 | 4.00 | 3.08 | 2.92 | 2.83 | 2.00 | 1.67 |

All of the training and test sequences were encoded using a H.264 encoder with the same encoder options set for each. A frame pattern of I,P,B,P,B,P was used with rate Control disabled and quantisation parameter QP fixed. The quantizer step-size parameters were then incremented between tests for each source file. The nomenclature used to describe the frames in the frame pattern is well-known in the art, an I frame is coded spatially only, a P frame is forward predicted based on previous I and P frames, and a B frame is coded based on a forward prediction from a previous I or P frame and a backward prediction from a succeeding I or P frame.

Formal single-stimulus subjective tests were performed using 12 subjects for both training and testing sets. Subjective scores were obtained using a 5-grade Absolute Categorisation Rating (ACR) scale ranging from 1 (bad) to 5 (excellent). Averaging the mean opinion scores (MOS) to obtain the mean MOS provides the MMOS results shown in Table 2 (training set) shown above and Table 3 (test set) shown below.

TABLE 3

Subjective scores for test sequences on a scale where 1 is bad and 5 is excellent.

| Sequence | QP-P, QP-B | | | | | | | | | | | |
|---|---|---|---|---|---|---|---|---|---|---|---|---|
| | 14 | 16 | 24 | 26 | 30 | 32 | 34 | 36 | 38 | 40 | 42 | 44 |
| Athletics | 4.50 | 4.33 | 4.58 | 4.08 | 3.67 | 3.58 | 2.75 | 2.42 | 2.00 | 1.25 | 1.08 | 1.00 |
| Football1 | 4.78 | 4.50 | 3.92 | 3.25 | 2.83 | 2.58 | 2.00 | 1.75 | 1.58 | 1.25 | 1.08 | 1.08 |
| News | 4.08 | 4.25 | 4.25 | 4.00 | 3.92 | 3.33 | 3.17 | 2.67 | 2.42 | 2.00 | 1.75 | 1.17 |
| Weather | 4.25 | 4.33 | 3.83 | 3.75 | 3.33 | 3.17 | 2.83 | 2.67 | 1.92 | 1.83 | 1.42 | 1.44 |
| Fries | 4.42 | 4.42 | 4.42 | 4.33 | 3.67 | 3.50 | 3.00 | 2.25 | 2.00 | 1.83 | 1.33 | 1.17 |
| Rocks | 4.25 | 4.50 | 4.58 | 4.58 | 4.25 | 4.08 | 4.17 | 3.67 | 2.92 | 2.17 | 1.75 | 1.42 |
| Sport | 4.58 | 4.75 | 4.42 | 4.42 | 3.92 | 3.17 | 2.67 | 2.67 | 2.25 | 1.33 | 1.42 | 1.17 |
| Calendar | 4.42 | 4.83 | 4.67 | 4.33 | 4.25 | 3.83 | 3.58 | 3.17 | 2.50 | 2.08 | 1.42 | 1.33 |
| Rugby | 4.42 | 4.50 | 4.58 | 4.33 | 3.75 | 4.42 | 3.75 | 3.33 | 2.83 | 2.50 | 2.17 | 1.83 |

It is known from References [1], [2], and [3] that for H.264 encoded video sequences an accurate prediction of the subjective quality of the decoded video sequence as perceived by a human viewer can be made from the combination of a measure of average quantizer step-size AvQP and a pixel-difference noise masking measure CS. In Reference [4], prediction accuracy is improved through use of an "active" region contrast measure CWS.

The embodiments of the invention described herein further refine known techniques by using a non-linear weighting of "active" regions combined with a non-linear weighting of "background" regions. In this section, the measures AvQP, CS and CWS are reviewed and the implementation and function of the new combined regional non-linear weighting function CWSN described, which comprises a non-linear Weighting of "Active" and "Background" Regions Referring now to FIG. 7 of the accompanying drawings, processing blocks retain the numbering scheme used in FIG. 5 for the processing performed by video decoder 32, and an additional processing block 48 is shown relating to the selection of a background area and processing block 36 of FIG. 5 is replaced by processing block 50 of FIG. 7 which additionally receives data output by processing block 36.

For H.264 encoded video, the quantiser parameter QP, which defines the spacing, QSTEP, of the linear quantiser used for encoding the transform coefficients, is included in the encoded bit-stream and is extracted when the encoded bit-stream is decoded by decoder 32 for analysis. The parameter OP functions as an indice for a table of predefined spacings, in which QSTEP doubles in size for every increment of 6 in QP (see References [5] and [10] for more information).

For a frame n from a set of N frames which collectively form a set of full "pictures" or equivalently "still images" in a video sequence, an average step-size measure AvQP(n) for each frame n may be calculated by analysing for each macroblock k in frame n, the quantizer values QP(n,k) according to Equation (4).

$$AvQP(n) = \frac{1}{Ktot_I} \sum_{k \in K(n)} QP(n, k) \quad (4)$$

$$n \in N$$

K(n) defines the set of macroblocks in frame n over which the analysis is to be performed and Ktot equals the number of macroblocks within this set. Accordingly, for each frame "n", the average quantiser step-size measure AvQP(n) is the sum of the quantiser values QP(n,k) for each macroblock k divided by the total number of macroblocks K(n).

By summing over the total number N frames forming a sequence, a sequence-averaged value of the AvQP is obtained. Accordingly, a sequence-averaged measure of average quantizer parameter for a video sequence of Ntot frames is:

$$AvQP = \frac{1}{Ntot} \sum_{n \in N} AvQP(n) \quad (5)$$

where Ntot is the total number of frames within the set of frames N.

Figure 7A:
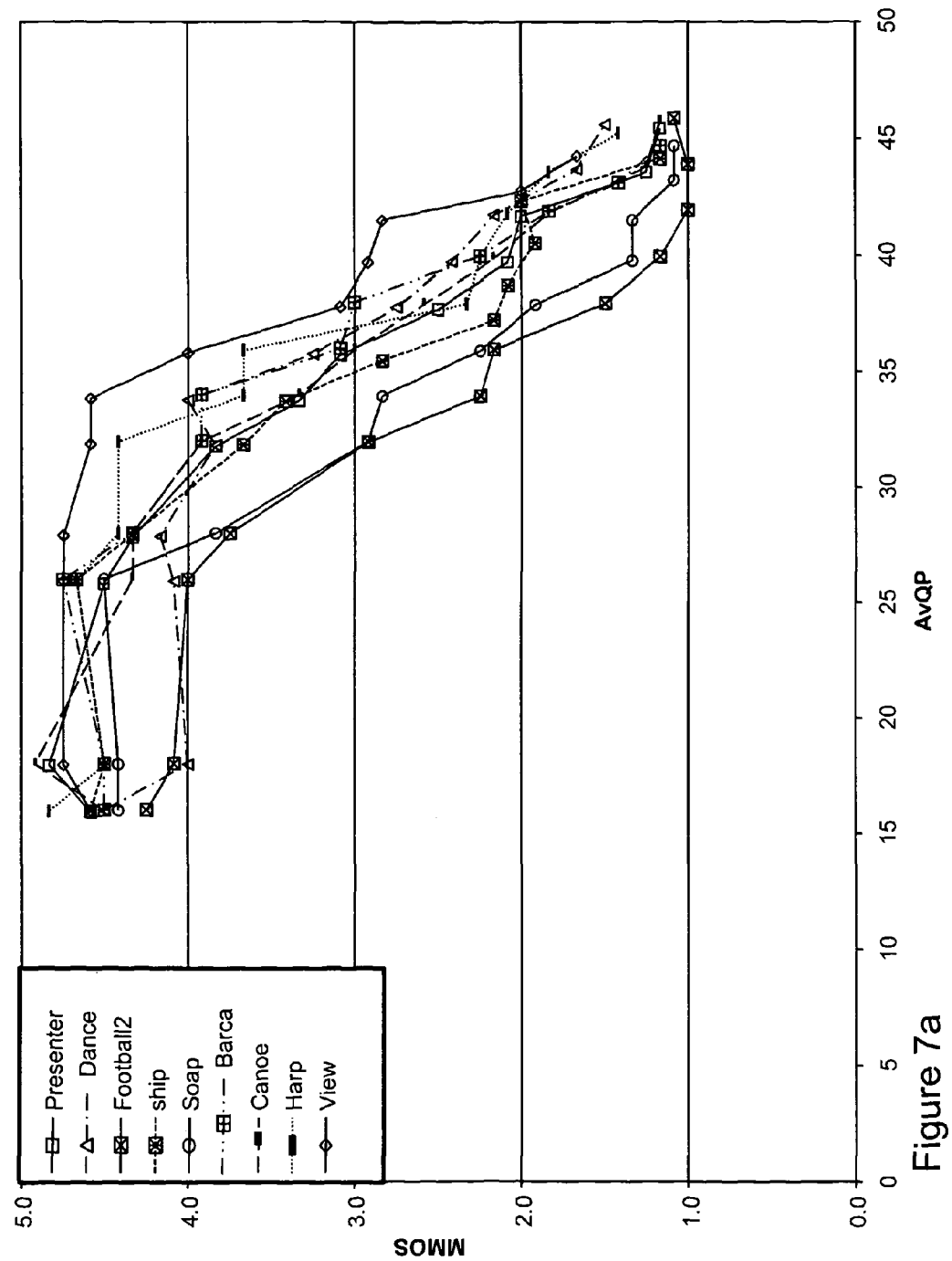
FIG. 7a shows how the MMOS varies against average quantizer step-size (AvQP) for nine training video sequences.
Figure 7B:
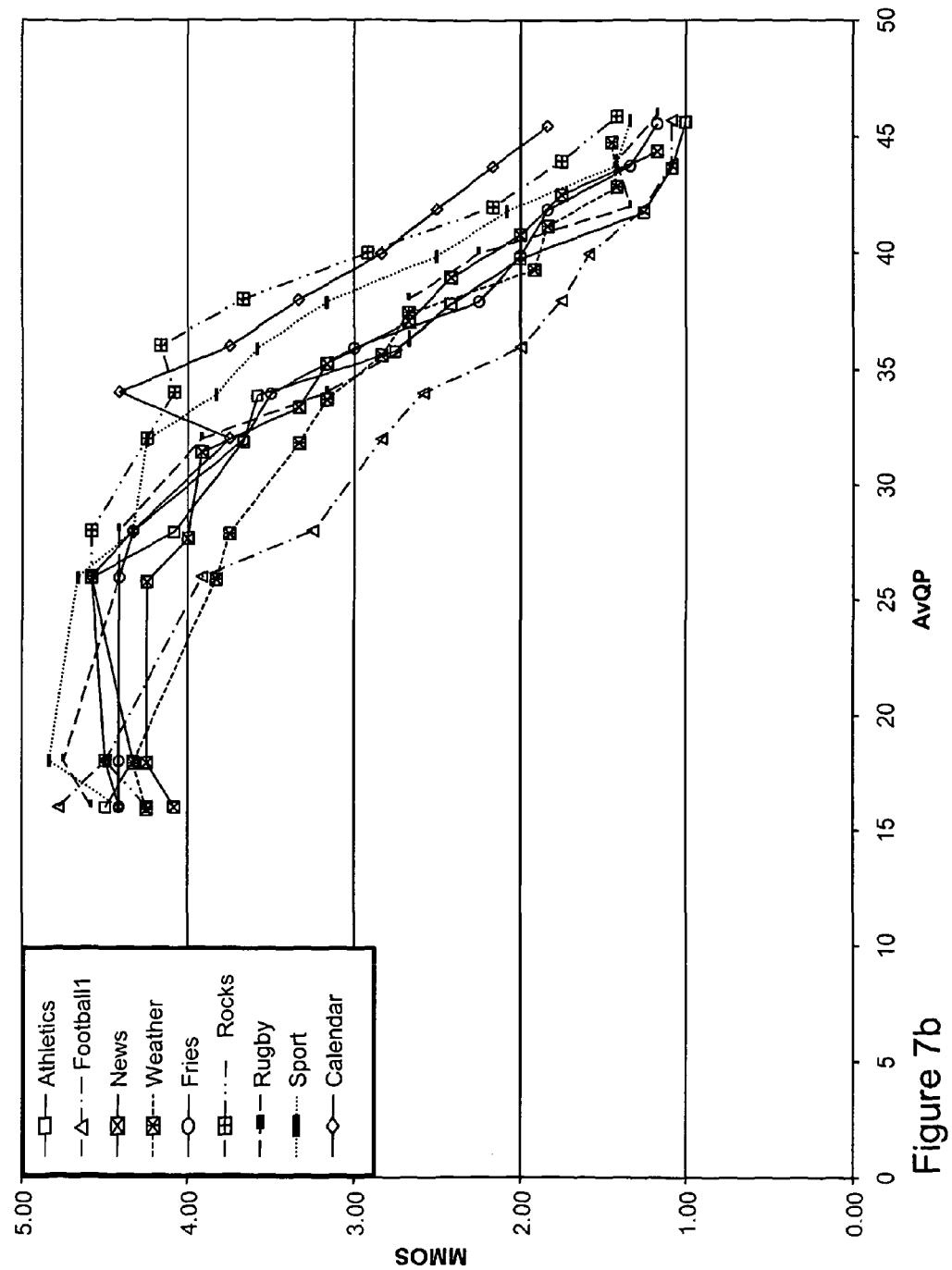
FIG. 7b shows how the MMOS varies against average quantizer step-size (AvQP) for nine test video sequences.

To gain a broad subjective view of the way the sequence-averaged measure of average quantiser parameter step size affects the perceived quality of a video sequence, the AvQP is plotted against the mean MOS score for the series of nine training video sequences shown in FIG. 7a and for the nine test video sequences shown in 7b. In FIGS. 7a,b, for each test on the training set, QP was fixed at one value of 14 to 42 for P and I macroblocks and 2 greater for B macroblocks. FIGS. 7a and 7b simply illustrate that AvQP is a good basic predictor of subjective score MMOS and that there is quite a consistent separation of the curves by content type for the sequences shown above in Tables 1, 2 and 3.

It is known that distortion masking is an important factor affecting the perception of distortion within coded video sequences. Such masking occurs because of the inability of the human perceptual mechanism to distinguish between signal and noise components within the same spectral, temporal or spatial locality. Such considerations are of great significance in the design of video encoders, where the efficient allocation of bits is essential. References [11], [12], and [13] describe research in this field in the transform and pixel domains. Where only a sequence averaged pixel-difference contrast measurement for each picture image CS is determined then only the pixel domain is considered. Reference [1] describes a way of determining a CS using pixel difference contrast measures $C_h$ and $C_v$ calculated for frame n according to Equations (1) and (2) herein-above, taking H1=H2=H and V1=V2=V, where H is the window length for horizontal pixel analysis and V is the window length for vertical pixel analysis, and X and Y are the horizontal and vertical picture analysis dimensions respectively. The combination of $C_h$ and $C_v$ give a horizontal-vertical measure $C_{hv}$ which is used to calculate an overall pixel difference measure, CF, for a frame according to:

$$CF(n) = (1/(X + 1 - 2H)(Y + 1 - 2V)) \sum_{y=V-1}^{Y-V-1} \sum_{x=H-1}^{X-H-1} C_{hv}(n, x, y) \quad (6)$$

$n \in N$ which provides a sequence-averaged pixel-contrast measure CS for a sequence of Ntot frames:

$$CS = (1/Ntot) \sum_{n \in N} CF(n) \quad (7)$$

Figure 7C:
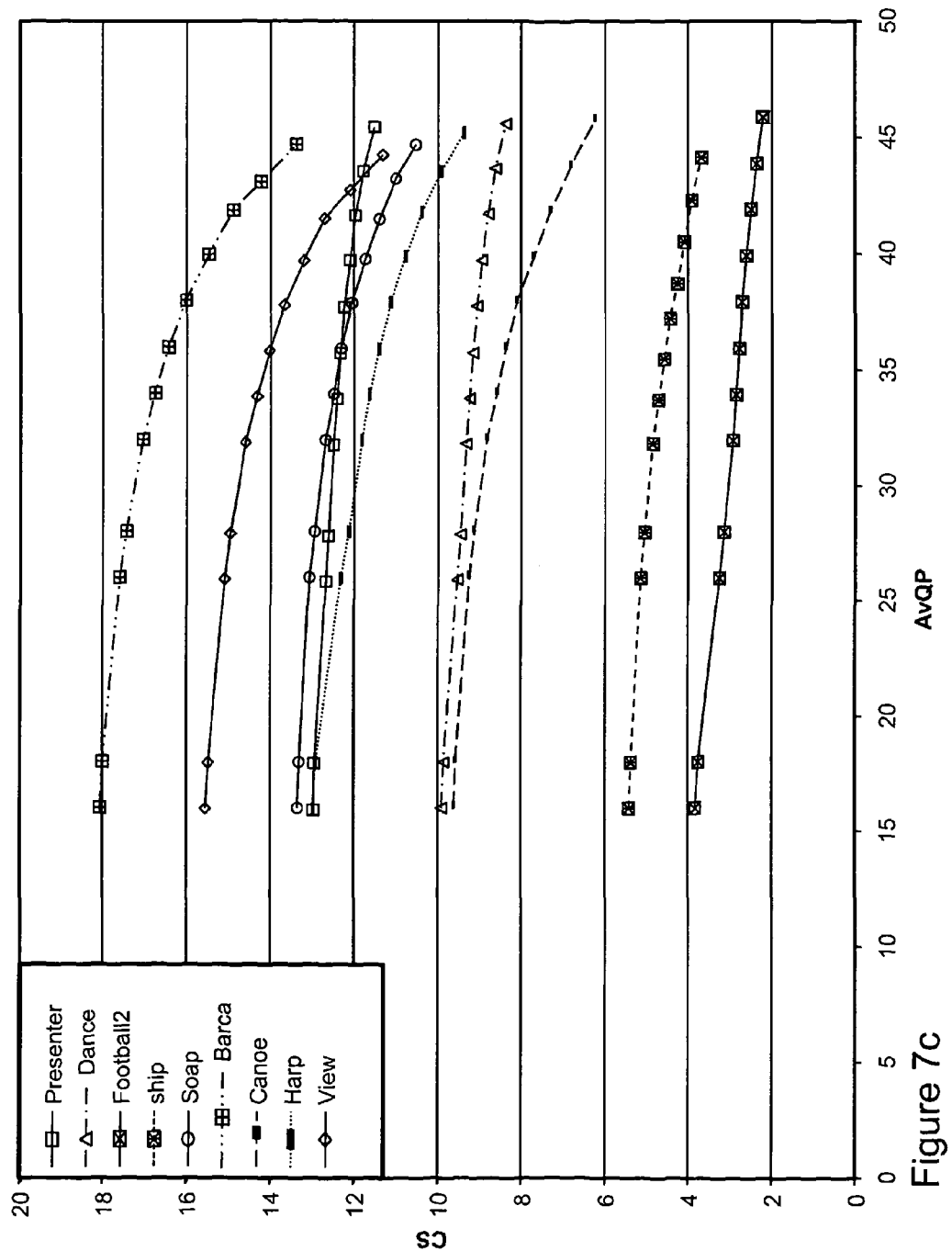

FIG. 7c shows the sequence-averaged pixel-difference contrast measure CS calculated for each of the nine decoded training sequences using H=4 and V=2 plotted against AvQP. This indicates that the sequence-averaged pixel-difference contrast measure CS is related to the noise masking properties of the sequence in which a high CS suggests high masking and therefore higher MMOS for a given quantizer step-size. The use of CS as a spatial complexity measure in no-reference quality estimation was tested by its inclusion in the multiple regression analysis described later herein below.

The sequence-averaged contrast measure CS utilizes a whole-image average CF of horizontal and vertical pixel-difference measures. Such a measure can have difficulties with images which contain large areas of well coded plain areas, as such areas would potentially have little visual impact but significantly affect the magnitude of CF and in turn CS.

Typical hybrid video coding algorithms, such as H.262, H.263 and H.264, include functions for the prediction of pixel blocks, transformation of the resulting difference blocks, quantization of the transformed coefficients and entropy coding of these quantized symbols. The encoding of broadcast format video sequences at bit rates <10 Mbit/s will typically result in the majority of the transform coefficients being quantized to zero. A high proportion of non-zero quantized coefficients will tend to indicate a region that is difficult to predict and with a high degree of detail. These regions are potentially useful for regional analysis as they tend to attract visual attention and are subjected to higher quantization effects.

It is convenient to base the regional analysis about the regular macroblock structures found in these encoders.

For frame number n, a prediction-residual measure is generated based on a prediction residual of the signal according to a first predetermined relationship. An example of such a masking measure is one based on prediction residuals dependent on a discrete cosine transform (DCT) activity. In one embodiment, a prediction-residual measure comprises Act1 $(n,k)$ which is calculated for a macroblock k in frame n according to:

$$Act1(n, k) = \sum_{m \in M(n,k)} Tsum(m) \quad (8)$$

$n \in N$ $k \in K(n)$

Here Tsum(m) represents the sum of non-zero quantized transform coefficients within macroblock m, M(n,k) defines a set of macroblocks centred on macroblock k over which a sum is to be performed, i.e., the region of macroblocks where the DCT activity is non-zero, and K(n) defines a set of macroblocks to be considered in frame n, where there are N frames (i.e., n=1, 2, . . . , N) in the video sequence to be considered.

For frame n, a region of maximum activity K1($n$) may be defined by applying a threshold to the activity array Act1 according to Equation (9):

$$K1(n) = \{k1 : Act1(n,k1) > Thresh1(n) \wedge k1 \not\in K(n)\} n \not\in N \quad (9)$$

Accordingly, a region of maximum activity in a picture provided by displaying frame n (K1($n$)) comprises a set of macroblocks k1 in the display frame (k1$\not\in$K(n)) for which the prediction-residual measure is greater than a prediction-residual threshold value, Thresh1($n$) for that frame. Thus in one embodiment of the invention a region of maximum activity K1 is defined to comprise macroblocks for which the DCT activity Act1($n$,k1) is greater than a DCT-activity-threshold value for that frame n.

In one embodiment, Thresh1 is defined as a function of the maximum activity within a picture according to Equation (10):

$$Thresh1(n) = \frac{Thresh1PerCent}{100.0} * \max_{k \in K(n)} (Act1(n, k)) \quad (10)$$

$$n \in N$$

Here Thresh1PerCent represents the % value of the maximum DCT activity of any macroblock k within the region of analysis K(n) of frame n that a macroblock region K(n) within the frame needs to contain for it to be considered within the region of "maximum" activity $K1(n)$.

The masking properties of the region of maximum activity K1 are estimated by calculating an average pixel-difference contrast function $C1(n)$ according to Equation (11):

$$C1(n) = \frac{1}{K1tot(n)} \sum_{k1 \in K1(n)} C0(k1) \quad (11)$$

$$n \in N$$

In Equation (11), K1tot(n) equals the number of frames in the set of frames $K1(n)$ for which DCT cosine activity $Act1(n, k1)$ is above $Thresh1(n)$ and $C0(k1)$ is a measure of contrast for the pixel area covered by M(n,k1), the set of macroblocks forming the region where the DCT cosine activity $Act1(n,k1)$ is above $Thresh1(n)$.

If $CF_K(k1)$ is defined as the pixel contrast measure CF from Equations 6 and 7 applied to the pixel area covered by the region where DCT cosine activity exists M(n,k1) then:

$$C0(k1)=CF_K(k1), \text{ for } k1 \notin K1(n) \quad (12)$$

The area of the picture comprising macroblocks which are within the initial analysis region K(n) but which is not included in the region of maximum activity $K1(n)$ formed by macroblocks for which the measure of the DCT activity Act1 is above the threshold level $Thresh1(n)$ for "maximum activity" is defined as $K2(n)$. Macroblocks k2 which are members of macroblock region $K2(n)$ are determined from Equation (13):

$$K2(n)=\{k2:k2 \notin K(n) \wedge k2 \in K1(n)\} \quad (13)$$

The region K2 comprises a so-called background region. Whilst region K2 is assumed to have less visible distortion than region K1, its contrast properties are capable of having an important effect on the perception of the overall distortion. Region K2 may have high contrast areas that have been well predicted and therefore not included in region K1. However, such areas might draw visual attention and provide general masking of distortions in K1.

Areas of a picture within K2 that have contrast properties high enough to provide a masking effect comparable with the masking effect provided by the high-activity regions in K1 are included in the analysis of the cropped picture K6 by using a threshold C0Thresh(n) to define a set $K3(n)$ according to Equation (14):

$$K3(n)=\{k3:C0(k3)>C0Thresh(n) \wedge k3 \in K2(n)\} n \notin N \quad (14)$$

where C0Thresh(n)=$C1(n)$. A threshold of C0Thresh equal to the average of contrast measure over the region of maximum activity K1 was found to be suitable for the sequences tested.

Equation (14) defines a high-complexity region K3 comprising macroblocks which have spatial complexity such that a masking effect is provided for any noise in the picture, i.e. for which significant contrast exists between pixels and which may have low-levels of non-zero DCT activity (i.e., a macroblock k in frame n will have an Act1(n,k) below Thresh1 (n)). The high activity region K1 and the high-contrast/spatial complexity region K3 that has zero or low-activity but significant contrast may be combined to make region K4 according to Equation (16).

$$K4=\{k4:k4 \notin (K1 \cup K3)\} \quad (16)$$

A weighted contrast measure CW for each frame is defined according to Equation (17) for the combined high-DCT activity regions K1 and the region K4, which may have zero or low-DCT activity:

$$CW(n) = \frac{1}{K4tot(n)} \sum_{k \in K4(n)} C0(k) \quad (17)$$

$$n \in N$$

Here K4tot(n) equals the number of members of the set K4 for frame n, =K1tot(n)+K3tot(n), where K1tot(n) is the number of macroblocks in frame n for which the DCT activity is above a threshold value and K3tot(n) is the number of macroblocks for which the DCT activity is zero or non-zero and for which the pixel-difference contrast measure is above a threshold value.

Using the weighted contrast measure CW for each frame forming a video sequence enables a sequence-averaged regionally weighted contrast measure CWS to be determined from Equation (18):

$$CWS = \frac{1}{Ntot} \sum_{n \in N} CW(n) \quad (18)$$

Figure 7D:
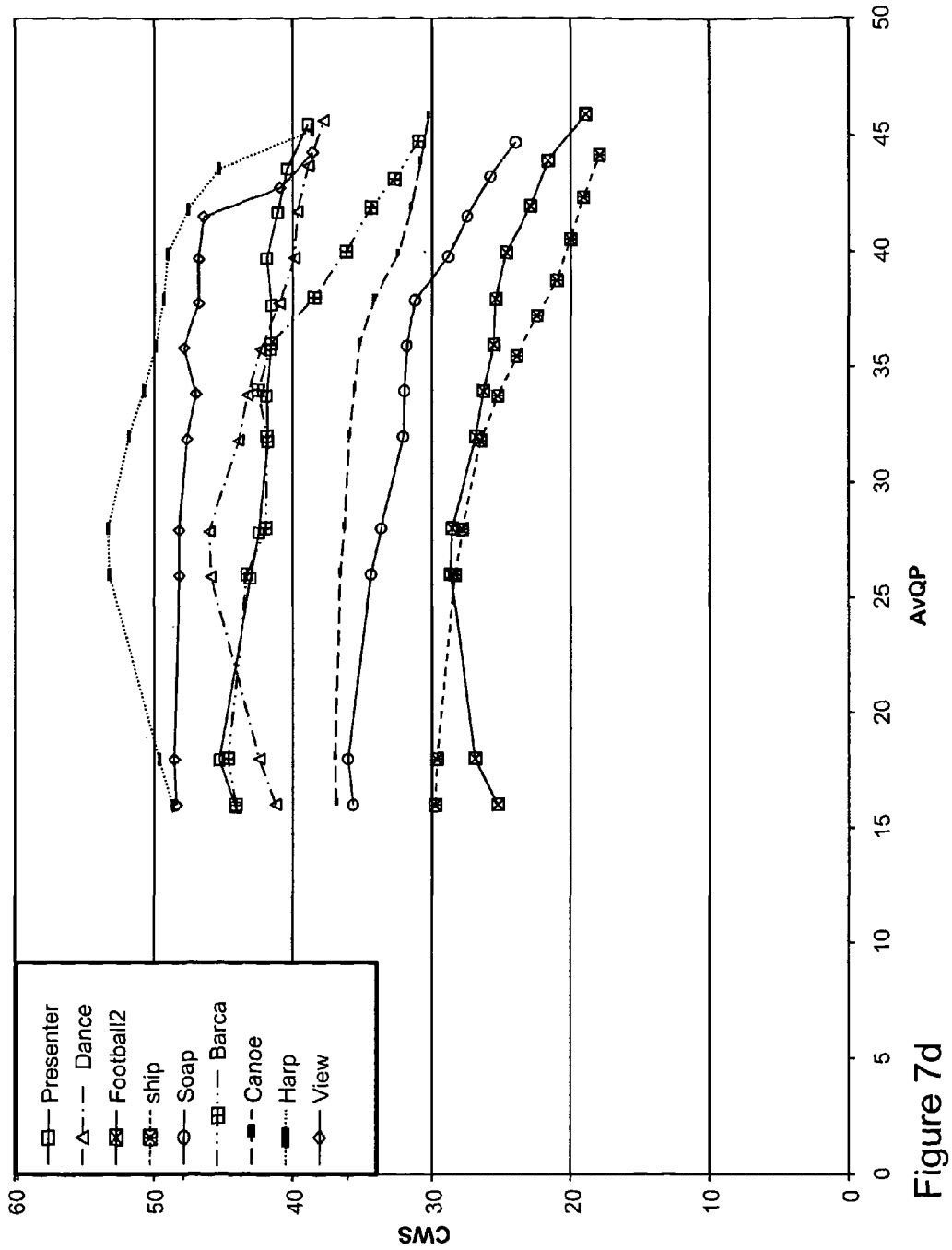

The sequence-averaged measure regionally weighted contrast measure CWS was calculated for each of the decoded training sequences and the results, plotted against average quantizer step size, are shown in FIG. 7d. The sequence-averaged regional measure CWS results in FIG. 7d show encouraging differences to the corresponding sequence-averaged CS results in FIG. 7c. The two sequences for "Harp" and "View", which have similar properties of low-motion and plain backgrounds, have moved to be top ranked by CWS rather than upper-middle ranked by CS. This shows excellent alignment with MMOS ranking in FIG. 7a for these video sequences. Similarly, sequence "Barcelona" moves from CS top-ranked to CWS mid-ranked, which more closely aligns with its MMOS mid-ranking for these video sequences shown in FIG. 7a.

The above regional measure CWS is designed to focus the analysis on parts of the image that have higher degrees of motion and detail. However, when the "active" area of a picture is small, then it is beneficial to include consideration of the remaining "background" portion of the image, such as is determined by process block 48 in FIG. 8 which shows schematically a system for generating a measure of quality for a video sequence according to an embodiment of the invention.

Figure 8:
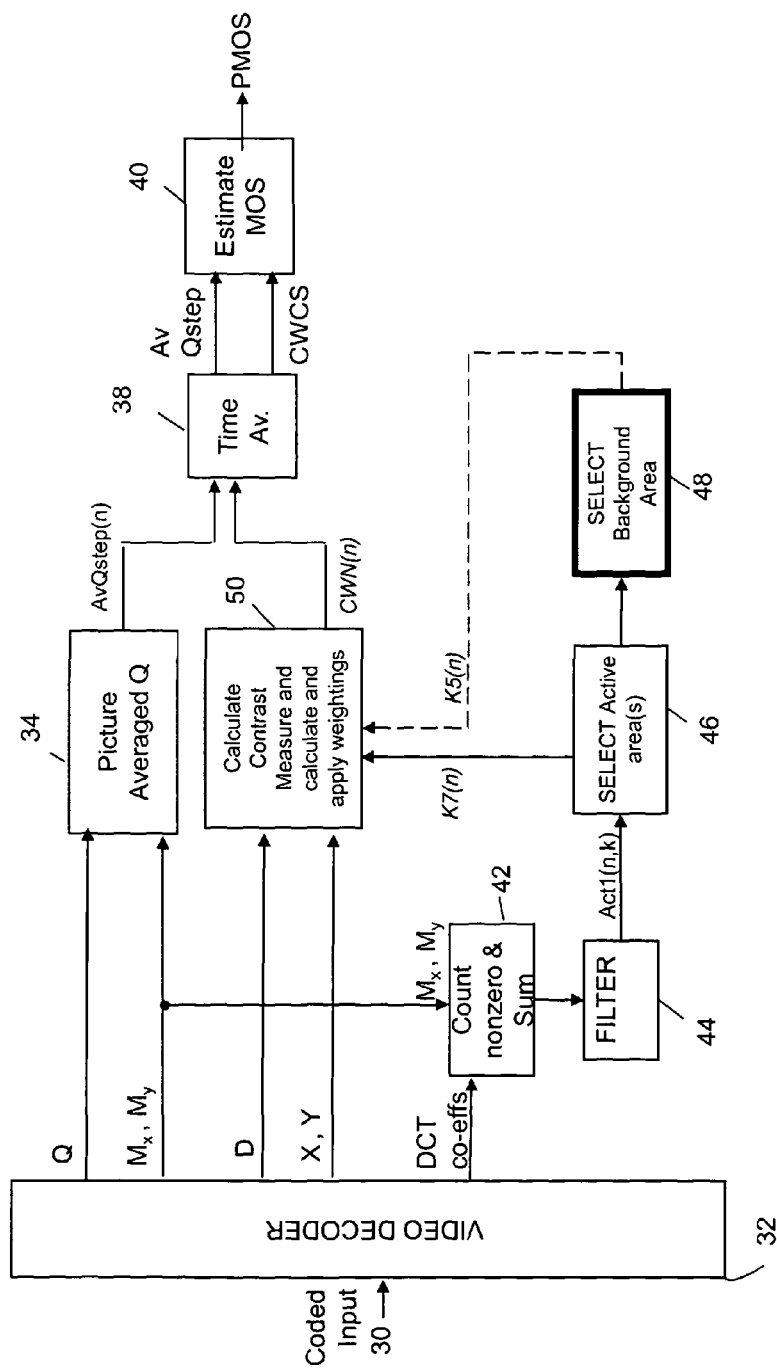
FIG. 8 shows a block diagram of an apparatus in which a background area is selected in order to include K5(n) when determining the contrast measure of picture region.

In the embodiment of the invention shown schematically in FIG. 8, process block 48 determines the "background" region $K5(n)$ of macroblocks within a given focus of attention region $K6(n)$ which are not members of the DCT active region K4(n). From K5(n), process block 50 in FIG. 8 can determine a contrast measure CW5(n) for the macroblocks in the region K5(n).

In any given method of determining a quality measure of a video sequence, the focus of attention region K6(n) is predetermined to comprise a sub-set of the overall analysis region K(n):

$$K6(n)=\{k6:k6 \subseteq K(n)\} \tag{19}$$

In the following exemplary embodiment of the invention, K6(n) is chosen to be a result of 25% cropping (left, right, top, bottom) of the image formed by frame n, but other values may be used in other embodiments of the invention as would be apparent to one of ordinary skill in the art.

The contrast measure CW5(n) which provides a measure of the spatial complexity of a "background" region K5 of picture n is according to Equation (20):

$$CW5(n) = \frac{1}{K5tot(n)} \sum_{k \in K5(n)} C0(k) \tag{20}$$

$$n \in N$$

Thus a so-called "background" region K5(n) according to the invention includes all macroblocks in a picture that are within a focus of attention region K6(n) but not members of "active" region K4(n) defined by Equation (16) above and K5tot(n) gives the number of elements in K5(n), $$K5(n)=\{k5:k5 \not\subseteq K6(n) \wedge k5 \in K4(n)\} \tag{21}$$

A so called "active" Region K7(n) according to the invention comprises all macroblocks in a picture which are within the focus of attention region K6(n) and also members of "active" region K4(n), and is defined by Equation (23):

$$K7(n)=\{k7:k7 \not\subseteq K6(n) \wedge k7 \not\subseteq K4(n)\} \tag{22}$$

A weighted contrast measure CW7(n) for the active portion K7(n) of focus of attention region K6(n) of frame n is defined by:

$$CW7(n) = \frac{1}{K7tot(n)} \sum_{k \in K7(n)} C0(k) \tag{23}$$

$$n \in N$$

where K7tot(n) is the total number of macroblocks.

A measure of the active proportion of the focus of attention region as a percentage of the entire frame is given by Equation (24):

$$CW7 \text{ percent}(n) = \frac{100 * K7tot(n)}{K6tot(n)} \tag{24}$$

$$n \in N$$

Figures 9, 10:
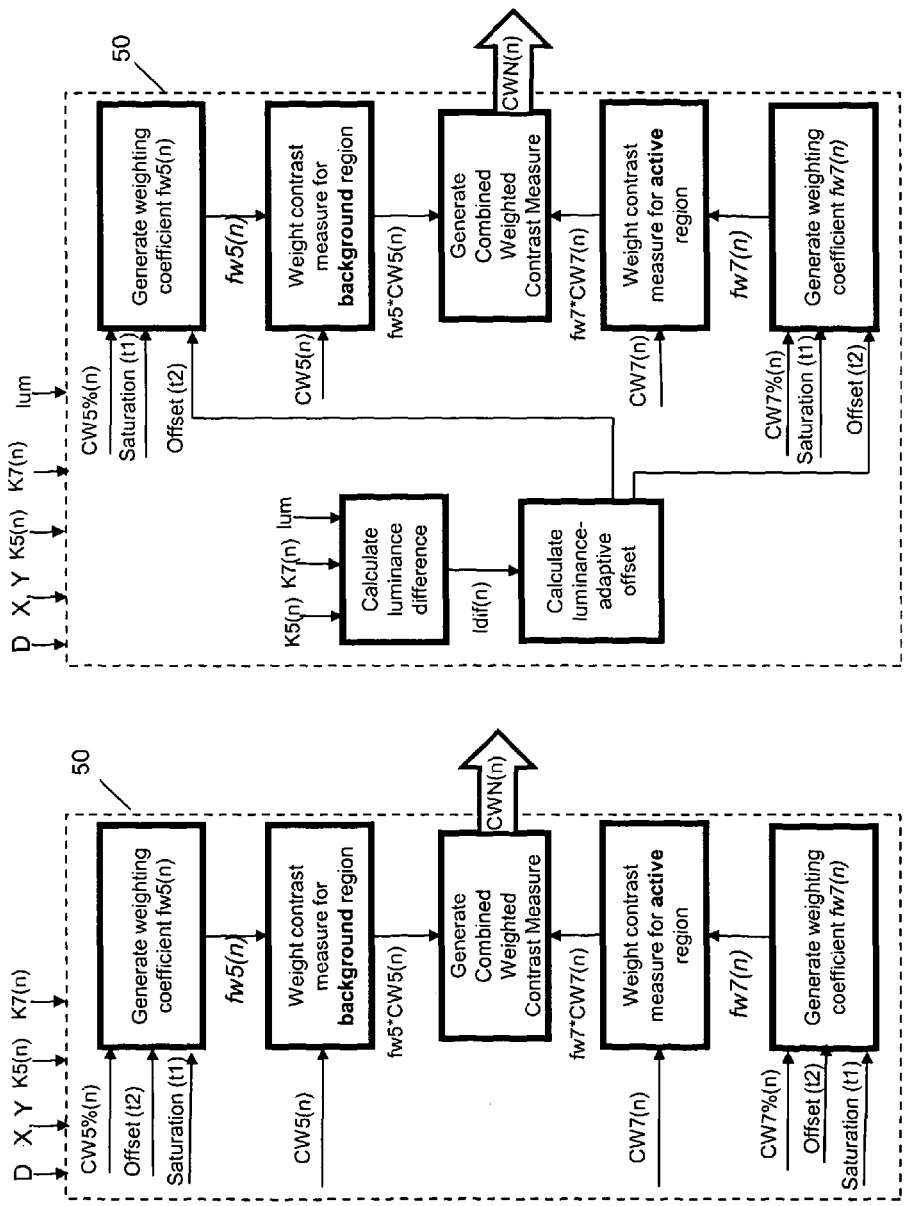
FIG. 9 shows schematically in block function form how CWN(n) can be generated according to an embodiment of the invention.
FIG. 10 shows schematically in block function form how the luminance-adapted offset can be used to generate CWN (n)

FIG. 9 shows a functional decoder component according to an embodiment of the invention which is arranged to implement process block 50 of FIG. 8. In FIG. 9, process block 50 generates a combined masking measure comprising a weighted combination CWN(n) of the contrast measure for "active" regions K7(n) and "background" regions K5(n) for each frame n calculated according to Equation (25) below by utilizing weighting functions fw5 and fw7:

$$CWN(n)=fw5(n)*CW5(n)+fw7(n)*CW7(n) n \not\in N \tag{25}$$

Experiments showed a non-linear weighting function fw7(n) of the form shown in Equation (26) below for active regions and fw5(n) for background regions in Equation (27) to perform particularly well in producing results which emulated the MMOS scores shown in FIG. 7*a*:

$$fw7(n) = \tag{26}$$

$$0.5 * \left(1 + \sin\left(\pi * \min\left(\max\left(\left(\frac{CW7 \text{ percent}(n) - 50}{100} * t1 + t2\right), -0.5\right), 0.5\right)\right)\right)$$

$$fw5(n)=1-fw7(n) \tag{27}$$

Here factors t1 and t2 are the saturation and offset factors respectively shown in FIGS. 9 and 10. The saturation factor t1 in Equation (26) defines the rate of change of the weighting factor with CWpercent (CW %) shown in each Figure.

In Eqn. (26), t2 defines a strength of activity threshold in the region K6 under which background properties will be considered.

In one embodiment of the invention, the strength of activity threshold t2 is measured by the area of active region K7 as a percentage CW7 percent (shown as CW % in the Figures) of the area of K6 (the cropped region of focus in each picture). Threshold t2 may be adjusted to take into account other properties of the active and background areas according to Eqn. (29):

$$t2(n)=ft(K5(n),K7(n)) \tag{29}$$

In FIG. 9, background region weighting coefficient fw5(n) is generated and applied to the contrast weighting CW5(n) to generate the weight contrast measure fw5(n)*CWN(n) for a selected background region and active region weighting coefficient fw7(n) is generated and applied to the contrast weighting CW7(n) to generate the weighted contrast measure for the active region selected fw7(n)*CWN(n) for each frame. The two weighted contrasts measures for the active and background regions are then combined to generate the overall weighted contrast measure CWN(n) for each frame n in the video sequence.

Figure 11A:
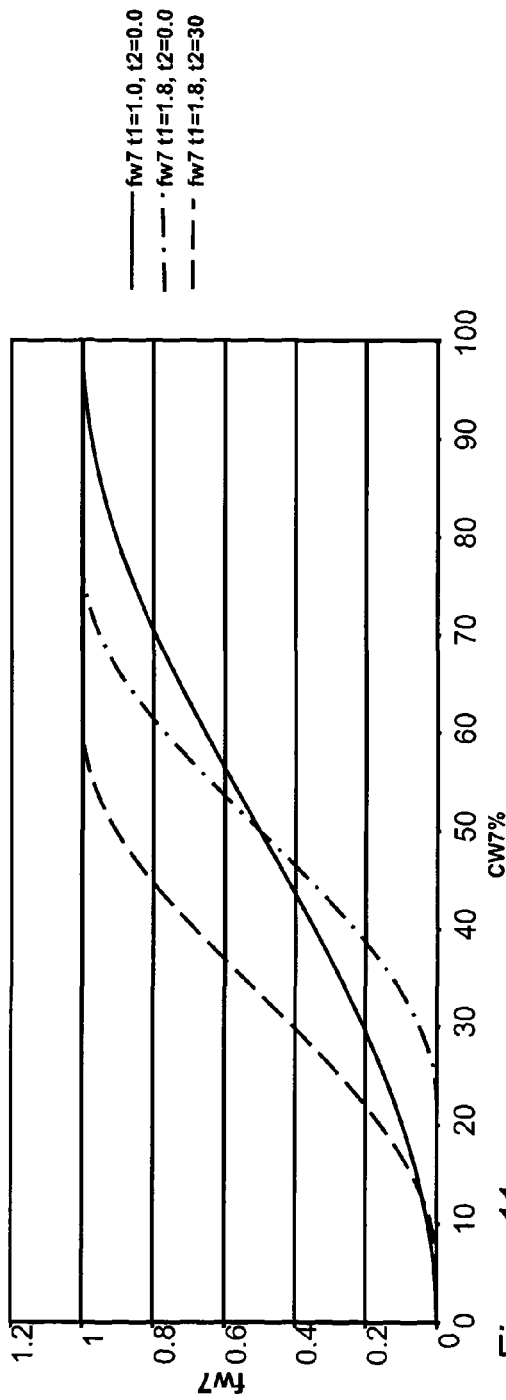
FIGS. 11a and 11b show how fw7 varies against CW7% for a variety of saturation values (t1) and offset (t2) values according to embodiments of the invention.

FIG. 11*a* illustrates the effects that these factors have on the function fw7. For t1=1.0 and t2=0.0, fw7(0 . . . 100) has a raised sine response that is symmetrical about CW7 percent=50% with a value of 1.0 at 100% and 0 at 0%. Increasing the factor t1 from 1.0 has the effect of moving the ±1 saturation points of fw7 up from 0% and down from 100%. Increasing the factor t2 from 0.0 shifts the whole fw7 curve to the left, therefore lowering the CW7 percent values for fw7 saturation. The fw5 weighting (Eqn. 27) is calculated to make a combined fw5 and fw7 weighting of 1. Values t1=1.8 and t2=30 were found to be suited to the application, having a number of desirable properties. The upper saturation point of 60% gives a strong weighting towards the contrast of the "active" region K7. Correspondingly, full weighting towards the "background" region K5 only occurs below the lower saturation point of 7%. The raised sine function gives a smooth transition between these points.

Returning now to FIG. 10, an embodiment of the invention is shown in which a functional component of the decoder arranged to implement process block 50 generates a combined contrast measurement, CWN(n). In this embodiment, however, the luminance of each macroblock k is determined from the corresponding pixel values of the decoded picture using an equivalent method to that described hereinabove for determining the spatial complexity of each macroblock from the corresponding pixel values. In FIG. 10, a measure of average luminance difference is included in the calculation of CWN(n) using Equation (30). The measure of the average luminance difference has the effect of emphasising active regions that have higher luminance than background regions. Accordingly, as shown in FIG. 10, a luminance difference Idif(n) for each frame is determined from Equation (30) and the t2 offset value which defines the threshold strength-of-DCT activity for which macroblocks forming background regions are considered taken into account for K6($n$), is now dependent on Idif(n), as given by:

$$Idif(n) = (1/k7tot(n)) * \sum_{k \in K7(n)} lum(k) - \left((1/k5tot(n)) * \sum_{k \in K5(n)} lum(k)\right) \quad (30)$$

Here, lum(k) equals the average luminance over each macroblock k. Luminance difference Idif may be used to adapt threshold t2($n$) according to Equation (31):

$$t2(n) = t2min + t2range * ((max(l1, min(l2, Idif(n))) - l1)/(l2-l1)) \quad (31)$$

Values l1=20 and l2=80 were found to be practical for a luminance range of 16.255. Values of t2min=20 and t2range=30 then give a range of t2($n$) from 20 to 50.

Figure 11B:
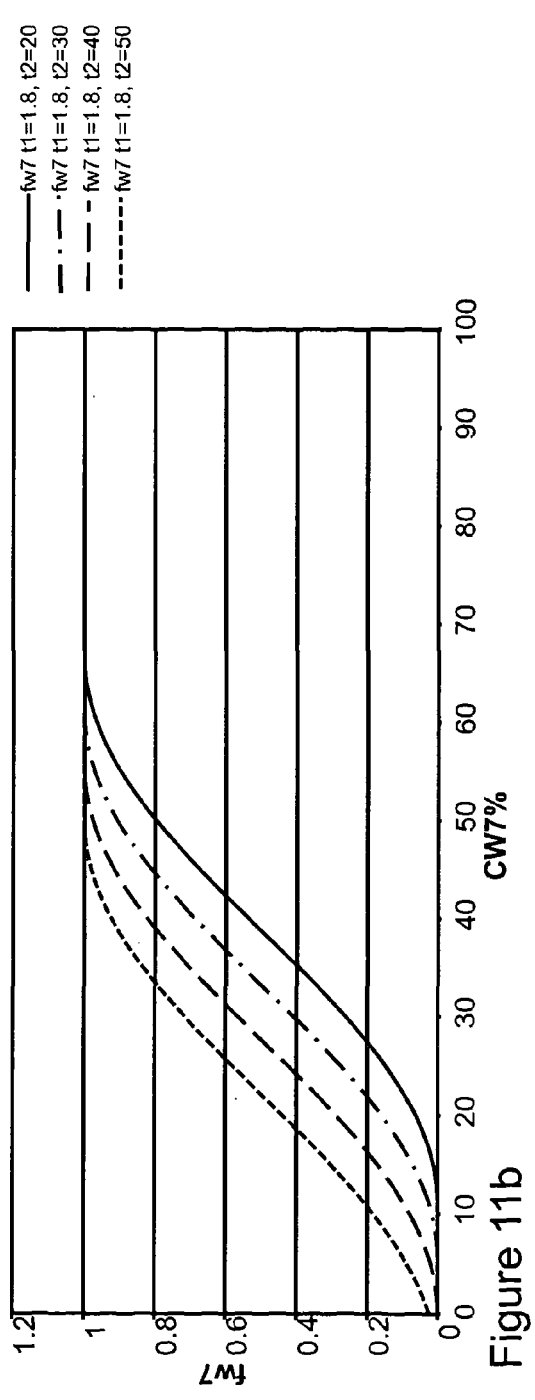

FIG. 11$b$ illustrates the effect that adapting t2 according to (31) has on the weighting function fw7.

As FIG. 11$b$ shows, by averaging over time, a sequence-averaged weighted contrast measure CWSN may be calculated according to Equation (32) based on the output of process block 50:

$$CWSN = \frac{1}{Ntot} \sum_{n \in N} CWN(n) \quad (32)$$

where n is the time of blocks displayed in a given time frame as determined by the AvQStep(n).

Using the above techniques in which the apparatus shown in FIG. 8 generates values for CWN(n) as described in FIGS. 9 and 10, predicted MMOS results were obtained for the video sequences shown in FIGS. 11$a$ and $b$.

Firstly, MMOS (dependent variable) for the training set was modelled by AvQP (independent variable) using standard linear and polynomial/logarithmic regression analysis as available in many commercial statistical software packages. The resulting model was then used on the test sequences. This was then repeated using CS, CWS and CWSN as additional independent variables. Table 5 gives the resulting weighting parameters for each model and shows that CWSN is currently acting as a refinement factor to the existing CWS parameter.

TABLE 5

Model weighting parameters.

|  | AvQP | AvQP, CS | AvQP, CWS | AvQP, CWS, CWSN |
|---|---|---|---|---|
| Const | −12.518 | −12.5938 | −11.968 | −12.1489 |
| AvQP | −0.4201 | −0.407498 | −0.378 | −0.3829 |
| Log(AvQP) | 19.686 | 19.132 | 17.56 | 17.805 |
| CS | 0 | 0.04817 | 0 | 0 |
| CWS | 0 | 0 | 0.0338 | 0.024 |
| CWSN | 0 | 0 | 0 | 1.2094 |

Equation (33) shows how the linear weighting functions from Table 5 may be used to calculate PMOS for the CWSN based model:

$$PMOS = -12.1489 - 0.3829 * AvQP + 17.805 * \log(AvQP) + 0.024 * CWS + 1.2094 * CWSN \quad (33)$$

For each model the squared correlation between estimated and measured mean opinion scores (PMOS and MMOS) and mean square error MS residuals are shown in Table 6.

TABLE 6

Correlation and MSE between MMOS and PMOS.

| | Correlation$^2$ (MSE) | | | |
|---|---|---|---|---|
| Sequence set | AvQP | AvQP, CS | AvQP, CWS | AvQP, CWS, CWSN |
| Training | 0.879(0.190) | 0.906(0.148) | 0.929(0.112) | 0.943(0.092) |
| Test sequences | 0.88(0.179) | 0.927(0.155) | 0.936(0.109) | 0.943(0.102) |

Results show that the AvQP, CWS, CWSN model gives the highest performance (correlation and MSE) for both training and test data sets. The individual training and test results for the AvQP, AvQP/CS, AvQP/CWS and AvQP/CWSN models are shown in the form of a scatter plots in FIGS. 12$a,b,c,d$ respectively.

The invention enables a video quality measure to be determined using measures based on quantizer step-size AvQP, average contrast CS and regionally weighted contrast CWS and a non-linearly weighted combination of "active" and "background" contrast measures. One or more embodiments of the invention enable improved accuracy of quality estimation over known techniques by determining the area, location and contrast of an "active" region of the highest motion and detail along with the area and contrast of the corresponding "background" region. The "active" and "background" measures are combined using a non-linear weighting function CWSN with adaptive thresholding that increasingly weights towards the "background" measure for sequences that have a low proportion of active areas.

CWSN has the effect of ignoring any "background" contribution when a significant proportion of the image is deemed to be active and of adding particular weight to background areas for images with low activity.

As shown above, the CWSN produced results which were her improved by using a measure of average luminance difference in the calculation of CWN(n) on which CWSN depends. The measure of the average luminance difference has the effect of emphasising active regions that have higher luminance than background regions.

Figure 13A:
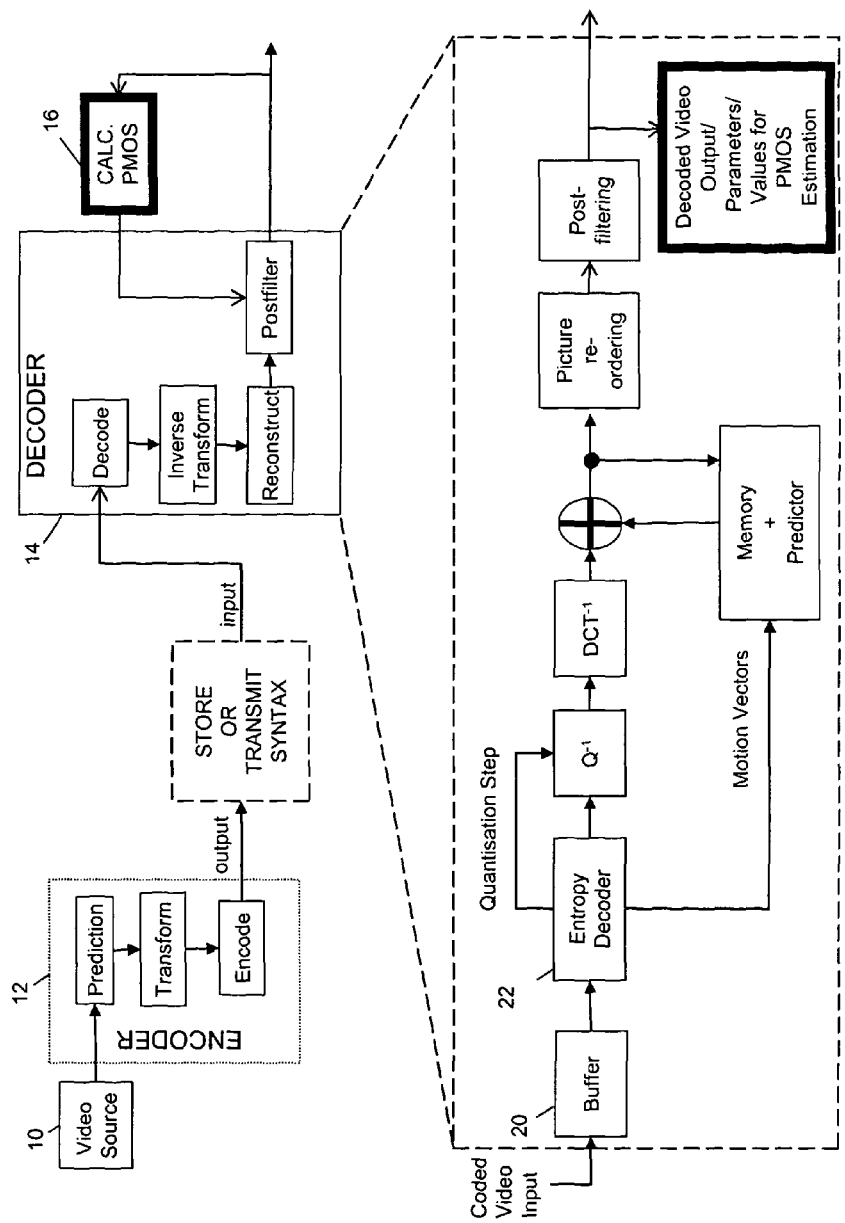
FIGS. 13A-13B show an encoding/decoding system in which the PMOS calculated is used to control post-filtering provided by a decoder according to the invention.

In this way, a perceived mean opinion score quality measure can be automatically calculated using a method of generating a measure of quality according to the invention. The quality measure could also be used to control the way a decoder applies post-filtering by functioning as a feedback loop, as FIGS. 13$a$ and 13$b$ of the accompanying drawings. FIGS. 13$a$ and 13$b$ show an encoding/decoding system of the type shown in FIG. 2 and retains the numbering scheme of FIG. 2 of the accompanying drawings for like elements.

In FIG. 13$a$, the post-filtered output from the decoder is used to generate a PMOS calculated using a method of determining a quality measure according to an embodiment of the invention. The resulting PMOS values can then be suitably fed back into the post-filter system and a new post-filtered signal output.

Figure 13B:
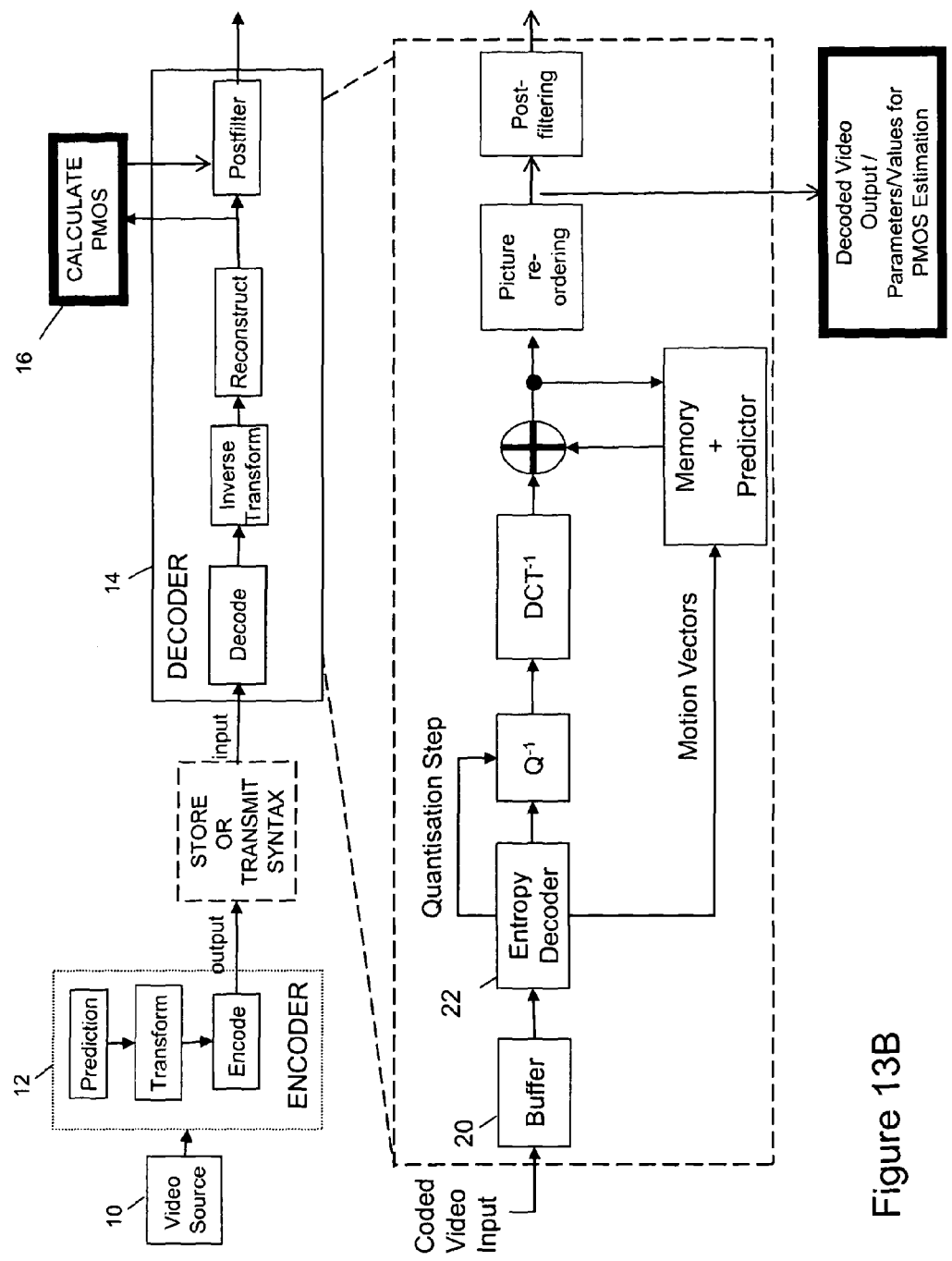

In FIG. 13b, a PMOS for one or more segments of a video sequence is calculated using a method of determining a quality measure according to an embodiment of the invention prior to post-filtering and the PMOS values are then used to adjust the post-filtering the decoder performs.

Exemplary embodiments of the invention are described in detail herein above and pictorially in the accompanying drawings, however, the invention is not intended to be limited to such exemplary embodiments and includes various obvious modifications and equivalent arrangements which fall within the scope of the appended claims. Features referred to explicitly herein and in the claims may be replaced with alternative features providing functional equivalents where such functional equivalents would be known to those of ordinary skill in the art.

In the above description, references to "one embodiment," "an embodiment," "example embodiment," "various embodiments," etc., indicate that the embodiment(s) of the invention so described include a particular feature, structure, or characteristic. However, it is not necessary for every embodiment to comprise that particular feature, structure, or characteristic. Where the phrase "in one embodiment," or "in an exemplary embodiment," is referred to herein above it may or may not refer to the same embodiment as would be apparent to one of ordinary skill in the art.

Terms referring to features such as, for example, "processing," "computing," "calculating," "determining," or the like refer to an action and/or process(es) undertaken by a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "computing platform" comprises one or more data processors, where a data "processor" refers to any device or portion of a device that processes electronic data from registers and/or memory to transform that electronic data into other electronic data that is capable of being stored in registers and/or memory.

One or more embodiments of the invention include apparatuses for performing the operations herein. An apparatus may be specially constructed for the desired purposes, or it may comprise a general purpose device selectively activated or reconfigured by a program stored in the device.

Where appropriate, a feature described herein in an embodiment of the invention may be implemented in one or a combination of hardware, firmware, and software. Where a feature is implemented as instructions stored on a machine-readable medium, such instructions may be read and executed by a computing platform to perform one or more or all of the operations and/or method steps described herein.

The term "machine-readable medium" comprises any mechanism for storing or transmitting information in a form readable by a machine (e.g., a computer). Examples of machine-readable mediums include, but are not limited to: read only memory (ROM), random access memory (RAM), magnetic disk storage media, optical storage media, flash memory devices, and propagated electrical, optical, acoustical or other suitable digital and/or analogue signals (for example, carrier waves, infrared signals, digital signals, etc).

References to the term "computer program" and/or "computer control logic" include as appropriate references to machine code and/or executable code and/or source code which when compiled results in execution on a computing platform of the computer program.

A computer program may be provided in an electronically downloadable format or in a format which is stored in the main memory and/or secondary memory of a computing platform and/or data storage means capable of being attached and removed from a computing platform. Where a computer program is stored in one or more data storage means it comprises a computer program product. Such computer programs, when executed, are arranged to enable the computer platform or system to perform the features of the present invention as discussed herein. In particular, the computer programs, when executed, are arranged to enable a processor to implement one or more steps in a method according to an embodiment of the invention. Accordingly, such computer programs may represent data controllers of the computer system.

A computer program product comprising a computer readable medium having control logic (computer software) stored therein may be provided to distribute the invention or cause, when the product is loaded and running on one or more computer platforms, a method according to an embodiment of the invention to be performed. The control logic, when executed by one or more processors, causes the one or more processors to perform one or more of the functions of a method according to an embodiment of the invention as described herein. The computer program product software may be loaded into a computer system using any appropriate means, including appropriate data storage reading means and/or via a network communications interface card. Software implementing control logic executed by a data processor causes the processor to perform the functions of an embodiment of the invention as described herein. The computer program product software may run as a standalone software application program running in an operating system. Alternatively, it may be integrated into an operating system of the computing platform.

Features implemented primarily in hardware may comprise, but are not limited to, hardware components such as application specific integrated circuits (ASICs), field programmable gateways (FPGAs) or one or more state machines, etc. Any appropriate implementation of the hardware state machine so as to perform the functions described herein may be used as is apparent to a person or persons skilled in the relevant art(s).

The embodiments and examples discussed herein are non-limiting. The embodiments of the invention described in detail herein above form exemplary embodiments only and it will be apparent to those skilled in the art that changes and modifications may be made without departing from the spirit and scope of the invention, for example, in its broader aspects. The embodiments of the invention as defined in the claims are intended to cover all such changes and modifications as fall within the true spirit of the invention.

The text of the abstract is repeated below to form part of the description:

A method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associated therewith and utilising differential coding such that the encoded signal contains representations of the prediction residual of the signal; and a decoded form in which the encoded video signal has been at least in part reconverted to the original form, the method comprising: a) generating a first quality measure which is dependant on said quantiser step size parameter according to a predetermined relationship; b) generating a masking measure, the masking measure being dependant on the spatial complexity of at least part of the frames represented by the video signal in the decoded form according to a first predetermined relationship; and c) generating a combined measure, the combined measure being dependant upon both the first measure and the masking measure according to a predetermined relationship, wherein, the method also includes: generating an first measure which is dependant on the prediction residual of the signal according to a first predetermined relationship; and identifying one or more regions of the picture for which the first measure exceeds a threshold, wherein the masking measure is dependant on the spatial complexity of the identified region(s) according to a predetermined relationship; and further comprises: generating a background measure which is dependant on the prediction residual of the signal according to a second predetermined relationship; and identifying one or more other regions of the picture for which the background measure is below a threshold, wherein the masking measure is dependent on the spatial complexity of the identified other region(s) according to a predetermined relationship.

REFERENCES

[1] A. G. Davis, D. Bayart, D. S. Hands, "Hybrid No-reference Video Quality Prediction," BMSB 2009, 13-15 May 2009.
[2], [3] WO 2007/066066
[4] WO2010/004238
[5] ISO/IEC 14496-10 and ITU-T Rec. H.264, Advanced Video Coding, 2003.
[6] Final report from the Video Quality Experts Group on the Validation of Objective Models of Video Quality Assessment, Phase 2, www.vqeg.org.
[7] ITU-T, J.144, "Objective perceptual video quality measurement techniques for digital cable television in the presence of a full reference".
[8] ITU-T, J.143, "User Requirements for Objective Perceptual Video Quality Measurements in Digital Cable Television".
[9] VQEG1 sequence database, address: ftp://ftp.crc.ca/crc/vqeg/TestSequences/ALL_625/
[10] Iain E. G. Richardson, H.264 and MPEG-4 Video Compression, Wiley 2003.
[11] W. Osberger, S. Hammond and N. Bergmann, "An MPEG Encoder Incorporating Perceptually Based Quantisation," IEEE TENCON—Speech and Image Technologies for Computing and Telecommunications, pp. 731-733, 1997.
[12] Atul Puri and R. Aravind, "Motion-Compensated Video Coding with Adaptive Perceptual Quantization," IEEE Transactions On Circuits and Systems for Video Technology, Vol. 1, No. 4, pp 351-361, December 1991.
[13] Bo Tao, Bradley W. Dickinson and Heidi A. Peterson, "Adaptive Model-Driven Bit Allocation for MPEG Video Coding," IEEE Transactions on Circuits and Systems for Video Technology, Vol. 10, No. 1, pp 147-157, February 2000.

The invention claimed is:

1. A method of generating a measure of quality for a decoded form of a video signal, the video signal having: an original form; an encoded form in which the video signal has been encoded using a compression algorithm utilising a variable quantiser step size such that the encoded signal has a quantiser step size parameter associated therewith and utilising differential coding such that the encoded signal contains representations of the prediction residual of the signal; and said decoded form in which the encoded video signal has been at least in part reconverted to the original form, the method comprising:
  generating a quality measure dependent on said quantiser step size parameter according to a predetermined relationship;
  generating a plurality of masking measures, and applying a weighting to each masking measure, wherein each masking measure is dependent on the spatial complexity of one or more types of regions present in pictures formed by decoding the video signal, and wherein
  one type of region comprises an active region of a picture in said video sequence for which a prediction residual measure meets a first condition, and
  at least one other type of region comprises a region of the picture in said video sequence for which said prediction residual measure meets another condition; and
  combining the quality measure and the plurality of weighted quality masking measures to generate a combined quality measure for the decoded form of the video signal.

2. A method as claimed in claim 1, wherein said first condition comprises said prediction residual measure exceeding a prediction-residual-threshold value for an active region of a picture, and wherein at least one said other type of region comprises a high-contrast region of the same picture and said other condition comprises:
  the prediction residual measure not exceeding a prediction-residual-threshold value for a high-contrast region; and
  a spatial complexity measure exceeding a spatial-complexity-threshold value for a high-contrast region.

3. A method as claimed in claim 2, wherein at least one said other type of region comprises a background region of the picture, and wherein said other condition comprises:
  the prediction residual measure not exceeding a prediction-residual-threshold value for a background region; and
  the spatial complexity measure not exceeding said spatial-complexity-threshold value for a background region.

4. A method as claimed in claim 1, wherein said first condition comprises said prediction residual measure exceeding a prediction-residual-threshold value for an active region of a picture, and at least one said other type of region comprises a background region of the picture, and wherein the other condition comprises:
  the prediction residual measure not exceeding a prediction-threshold-value for a background region; and
  a spatial complexity measure not exceeding a spatial-complexity-threshold value for a background region.

5. A method as claimed in claim 1, wherein when combining said quality measure and each of said plurality of quality masking measures for each type of region, a weighting function is applied to each quality masking measure dependent on the type of region.

6. A method as claimed in claim 5, further comprising determining a luminance measure dependent on the pixel luminance difference within at least one type of region, wherein the weighting function for each region of a said frame is dependent on the luminance within each region or luminance difference between regions.

7. A method as claimed in claim 1, wherein the representations of the prediction residual are the coefficients of a two-dimensional transform of the pixel-domain prediction residual, and one or both of the first and second measure is a calculated from said coefficients.

8. A method as claimed in claim 7, wherein the transform is the discrete cosine transform.

9. A method as claimed in claim 7, wherein a said measure is a count of the number of nonzero transform coefficients.

10. A method as claimed in claim 7, wherein a said measure is dependent on the amplitudes of the transform coefficients.

11. A method as claimed in claim 10, wherein a said measure is a function of the sum of the energies of the decoded coefficients.

12. A method as claimed in claim 1 in which the first quality measure is derived only from those parts of the picture from which the masking measure is derived.

13. A method as claimed in claim 1, wherein the spatial complexity is measured by determining a local contrast measure at a plurality of positions in a frame.

14. A method as claimed in claim 13, wherein each frame includes plurality of pixels, and wherein for at least some of the pixels of a given frame, the comparison function is performed on neighbouring regions in the vicinity of a pixel, so as to obtain a comparison value in respect of that pixel.

15. A method as claimed in claim 1, wherein a quality measure and/or masking measure is averaged over a plurality of frames.

16. Apparatus comprising a decoder for a video sequence and further comprising means arranged to perform one or more steps according to the method described in claim 1.

17. A method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associated therewith and utilising differential coding such that the encoded signal contains representations of the prediction residual of the signal; and a decoded form in which the encoded video signal has been at least in part reconverted to the original form, the method comprising:
generating a first quality measure which is dependent on said quantiser step size parameter according to a predetermined relationship;
generating a masking measure, the masking measure being dependant on the spatial complexity of at least part of the frames represented by the video signal in the decoded form according to a first predetermined relationship; and
generating a combined measure, the combined measure being dependent upon both the first quality measure and the masking measure according to a predetermined relationship,
wherein, the method is characterised by said masking measure being dependant on the spatial complexity of one or more active region(s) according to a predetermined relationship and on the spatial complexity of one or more background regions according to a predetermined relationship,
wherein said one or more active regions are identified by:
generating a first measure which is dependent on the prediction residual of the signal according to a first predetermined relationship, and
identifying one or more regions for which the first measure meets a condition as one or more active regions; and,
wherein said one or more background regions are identified by:
generating a second measure which is dependent on the prediction residual of the signal according to a second predetermined relationship; and
identifying one or more background regions of the picture for which the second measure meets a condition as one or more background regions.

18. A method as claimed in claim 17, wherein a said measure includes a temporally determined component, and wherein said regions of the picture for which the first measure meets a condition are determined from temporal changes to said picture regions.

19. A method as claimed in claim 17, wherein said condition which the first measure is to meet comprises the first measure exceeding a threshold value, and wherein the masking measure includes a function of the spatial complexity of
(a) the identified region(s) of the picture for which the first measure exceeds a threshold and
(b) a region or regions of the picture in which the first measure does not exceed the threshold but in which the spatial complexity exceeds a second threshold.

20. A method according to claim 19, wherein the second threshold is dynamically varied, being a function of the spatial complexity calculated for the identified region(s).

21. A method according to claim 20, in which the second threshold is equal to the average value of the spatial complexity calculated for the identified region(s).

22. Apparatus arranged to generate a measure of quality for a plurality of frames of a decoded form of a video signal, the video signal having: an original form; an encoded form in which the original form of the video signal has been encoded using a compression algorithm utilising a variable quantiser step size such that the encoded signal has a quantiser step size parameter associated therewith and utilising differential coding such that the encoded signal contains representations of the prediction residual of the signal; and said decoded form in which the encoded video signal has been at least in part reconverted to the original form, the apparatus comprising:
means to generate a quality measure which is dependent on said quantiser step size parameter according to a predetermined relationship;
means to determine one or more active regions in a picture of said video sequence for which the prediction residual exceeds a threshold condition;
means to determine other types of regions within any remaining part of said picture;
means to generate a masking measures dependent on the spatial complexity of each of said active regions and each determined type of region; and
means to generate a combined quality measure by combining said quality measure and masking measure according to a predetermined relationship.

23. Apparatus as claimed in claim 22, wherein said means to determine a masking measure determines a spatial complexity masking measure for each said region which is dependent on a pixel-difference contrast measure for the pixels forming the area of the respective region.

24. Apparatus as claimed in claim 22, wherein said means to determine a masking measure comprises means for determining and combining spatial complexity masking measures for each determined region using a different weighting function for each different type of determined region.

25. Apparatus as claimed in claim 24, wherein the weighting function for each region of a said frame is dependent on the luminance within each region or luminance difference between regions.

* * * * *